United States Patent [19]

Hale et al.

[11] Patent Number: 5,076,364

[45] Date of Patent: Dec. 31, 1991

[54] GAS HYDRATE INHIBITION

[75] Inventors: Arthur H. Hale; Ashok K. R. Dewan; George C. Blytas, all of Houston, Tex.

[73] Assignee: Shell Oil Company, Houston, Tex.

[21] Appl. No.: 671,629

[22] Filed: Mar. 19, 1991

Related U.S. Application Data

[60] Continuation-in-part of Ser. No. 503,502, Mar. 30, 1990, abandoned, which is a continuation-in-part of Ser. No. 373,605, Jun. 30, 1989, abandoned, which is a division of Ser. No. 167,661, Mar. 14, 1988, abandoned.

[51] Int. Cl.$^5$ .................. E21B 43/00; E21B 43/12
[52] U.S. Cl. .................. 166/310; 166/371; 252/8.551
[58] Field of Search .............. 166/279, 310, 371, 902; 175/40, 50, 65, 66; 252/8.51, 8.513, 8.514, 8.551

[56] References Cited

U.S. PATENT DOCUMENTS

| 2,191,312 | 2/1940 | Cannon | 252/8.511 |
|---|---|---|---|
| 3,223,622 | 12/1965 | Lummus et al. | 175/65 X |
| 3,301,323 | 1/1967 | Parsons | 166/902 X |
| 3,348,614 | 10/1967 | Sinclair et al. | 166/310 |
| 3,728,259 | 4/1973 | Christman | 175/65 X |
| 3,738,437 | 6/1973 | Scheuerman | 175/71 X |
| 4,053,422 | 10/1977 | Walker | 252/8.51 |
| 4,456,067 | 6/1984 | Pinner, Jr. | 166/279 |
| 4,478,612 | 10/1984 | Diaz et al. | 55/29 |
| 4,508,628 | 4/1985 | Walker et al. | 252/8.515 |
| 4,597,779 | 7/1986 | Diaz | 166/267 X |
| 4,802,998 | 2/1989 | Mueller et al. | 252/8.514 |
| 4,856,593 | 8/1989 | Matthews et al. | 166/371 |

FOREIGN PATENT DOCUMENTS

| 324887A | 1/1988 | European Pat. Off. . |
|---|---|---|
| 374671A | 12/1988 | European Pat. Off. . |
| 382070A | 2/1989 | European Pat. Off. . |
| 382071A | 2/1989 | European Pat. Off. . |
| 386636A | 3/1989 | European Pat. Off. . |
| 386638A | 3/1989 | European Pat. Off. . |
| 391251A | 4/1989 | European Pat. Off. . |
| 391252A | 4/1989 | European Pat. Off. . |
| 339270A1 | 5/1989 | European Pat. Off. . |
| 398112A | 5/1989 | European Pat. Off. . |
| 398113A | 5/1989 | European Pat. Off. . |
| 374672A | 12/1989 | European Pat. Off. . |
| 2216573A | 10/1989 | United Kingdom . |
| 2216574A | 10/1989 | United Kingdom . |
| 2223255A | 4/1990 | United Kingdom . |

Primary Examiner—George A. Suchfield

[57] ABSTRACT

Gas hydrate formation in a gas well is prevented by injecting a carrier and an alcohol (e.g., glycerol or a glycerol derivative) into the well and connected facilities/pipelines.

11 Claims, 10 Drawing Sheets

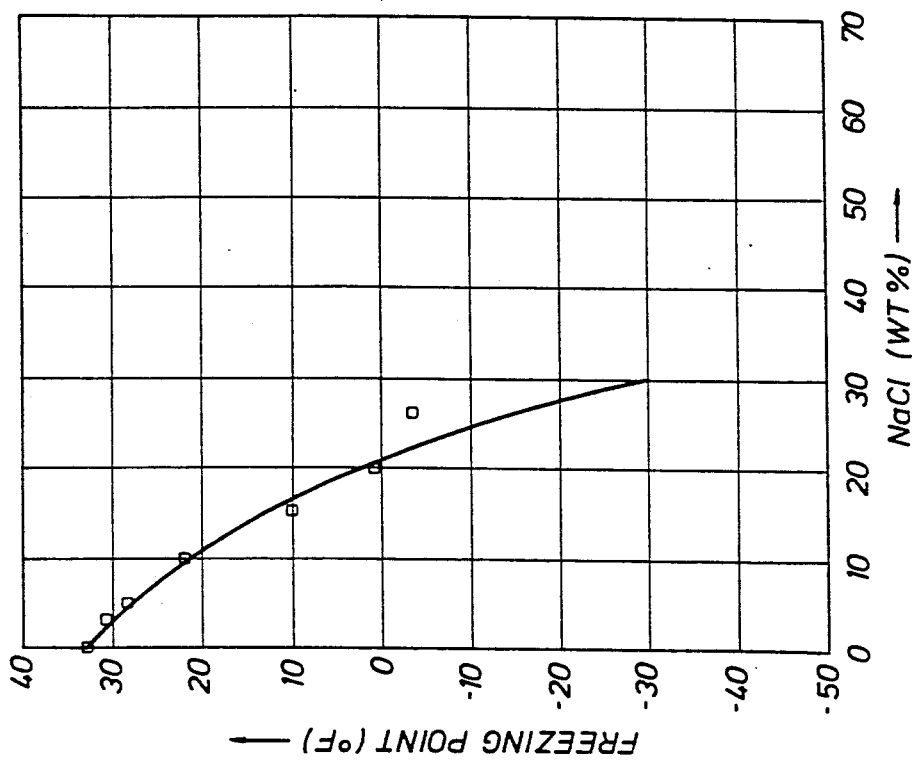
FIG. 4 FREEZING POINT DEPRESSION GLYCEROL-FREE BASIS
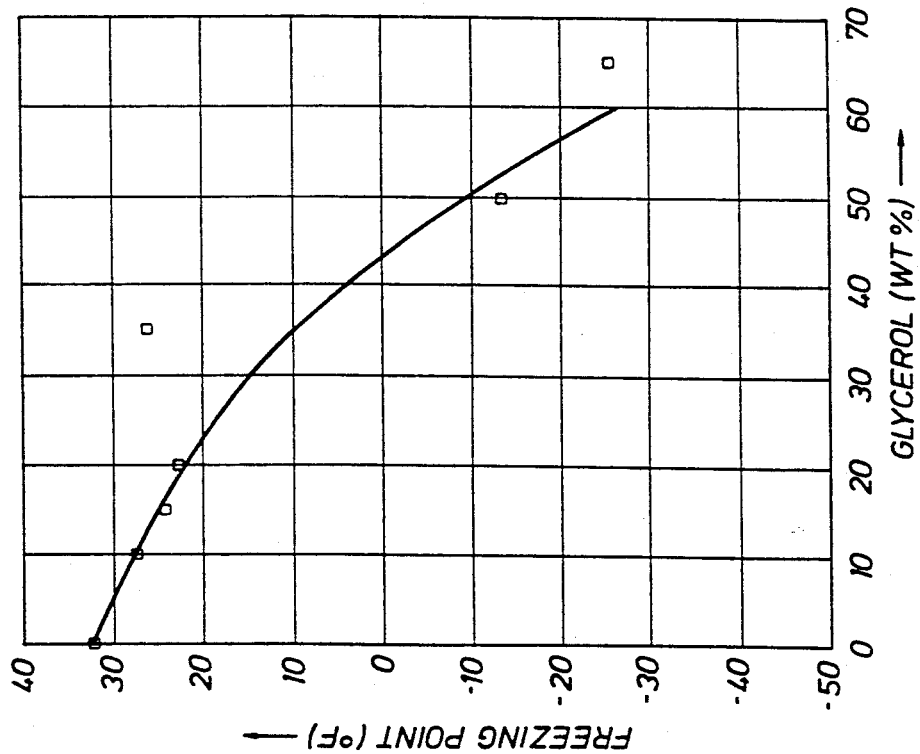
FIG. 2 FREEZING POINT DEPRESSION 0.0 % (WT) NaCl

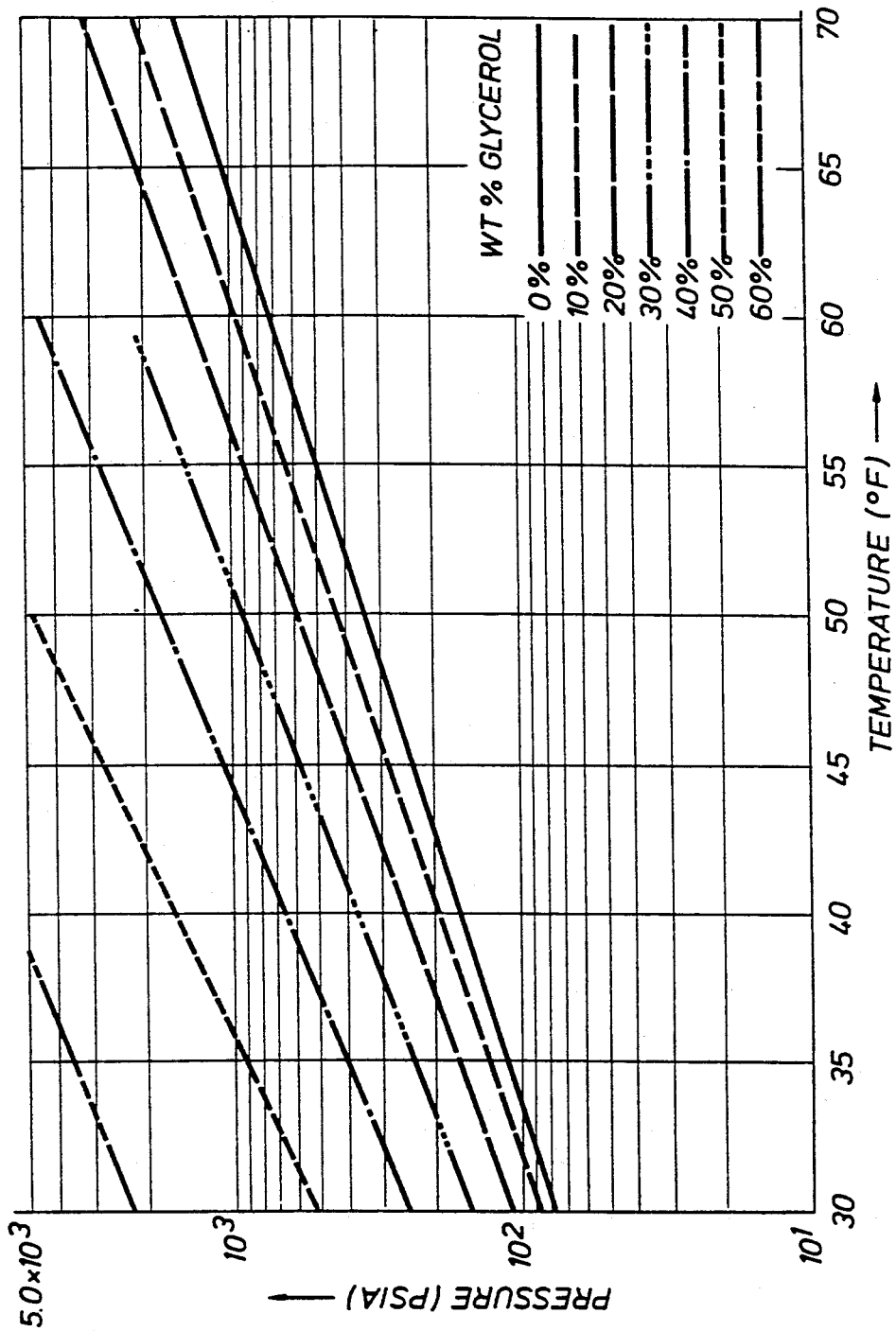

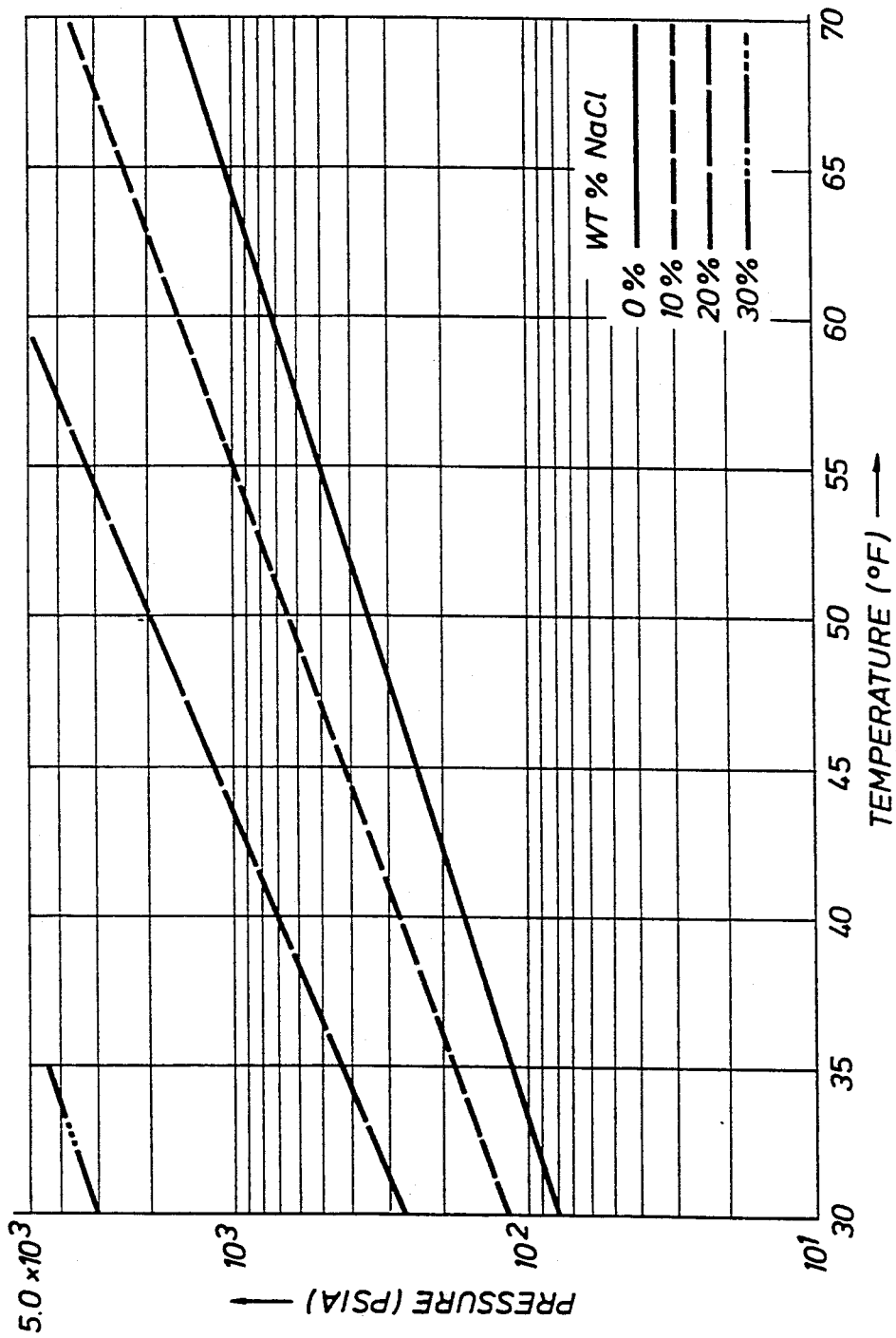

FREEZING POINT DEPRESSION
10 % (WT) NaCl

FREEZING POINT DEPRESSION
2.5 % (WT) NaCl

FREEZING POINT DEPRESSION
20 % (WT) NaCl

GAS HYDRATE INHIBITION WITH GLYCEROL
20.0 %(WT) NaCl IN NaCl/GLYCEROL/WATER

GAS HYDRATE INHIBITION

This is a Continuation-in-Part of application Ser. No. 07/503,502, filed Mar. 30, 1990, now abandoned, which is a Continuation-in-Part of application Ser. No. 07/373,605, filed June 30, 1989, now abandoned, which is a Division of application Ser. No. 07/167,661, filed Mar. 14, 1988, now abandoned.

BACKGROUND OF THE INVENTION

The invention relates to a process and inhibitor for inhibiting the formation of gas hydrates in gas-productive drilling or workover wells, and producing wells and facilities (may be subsurface), onshore and offshore, from both fixed platforms and floating platforms, by injecting a carrier and an alcohol (e.g., glycerol and/or glycerol-based organics), optionally including an inorganic salt, into the well. The carrier is preferably a drilling mud for drilling or workover wells, or the free water phase in case of producing wells and facilities.

In the production of gas from a subterranean formation in locations of extreme cold, solid gas hydrates may occur. Such hydrates occur when the produced gas contacts cold temperatures under high pressures. Hydrates may form to such an extent that the well casing and surface lines transporting the gas become plugged. Obstructions formed of such hydrates can only be removed from the well casing and surface lines with great difficulty, if at all. The situation is particularly acute where an offshore well must be temporarily abandoned, due to a hurricane or other problem, and the drilling rig removed to another location or the well is shut-in. The presence of the gas in the wellhead having a tendency to form gas hydrates, over a period of time when subjected to appropriate operating conditions, is substantial and the well under such conditions may plug. Accordingly, the art is in need of a process for dealing with the temporary abandonment of a drilling well in an offshore environment, or a producing well is temporarily shut-in, and how to avoid gas hydrate formation under such conditions.

Applicant is not aware of any prior art which, in his judgment as one skilled in the well drilling art, would anticipate or render obvious the novel process and inhibitors of the present invention; however, for the purposes of fully developing the background of the invention, and establishing the state of the requisite art, the following is set forth: U.S. Pat. Nos. 4,456,067; 4,063,603; 4,508,628; 4,478,612; 4,597,779 and 3,738,437.

SUMMARY OF THE INVENTION

The present invention relates to a process and inhibitors for inhibiting gas hydrate formation in a gas-productive drilling or workover well. The invention also includes application of the gas hydrate inhibitors to producing wells and facilities, onshore and offshore, from both fixed platforms and floating platforms such as tension leg platforms and compliant towers. The facilities may be subsea production systems.

In accordance with a preferred embodiment a process and inhibitor are provided for inhibiting gas hydrate formation in a drilling well comprising injecting a carrier and an alcohol (e.g., glycerol), optionally including salt, into the well. The alcohol is preferably an acyclic polyol, a monoalicyclicpolyol or a cyclicetherpolyol. For drilling or workover wells the inhibitor of the present invention utilizes a drilling mud or polymer as a carrier and becomes what is known in the art as a "pill" which is injected into the well before the well is abandoned. For producing wells that are temporarily shut-in, the inhibitor fluid may be injected at mud-line, below mud-line and/or at other points in the facilities.

Other purposes, distinctions over the art, advantages and features of the invention will be apparent to one skilled in the art upon review of the following.

BRIEF DESCRIPTION OF THE DRAWINGS

FIGS. 2 through 11 illustrate various parameters of the invention.

DESCRIPTION OF PREFERRED EMBODIMENTS

Figure 1:
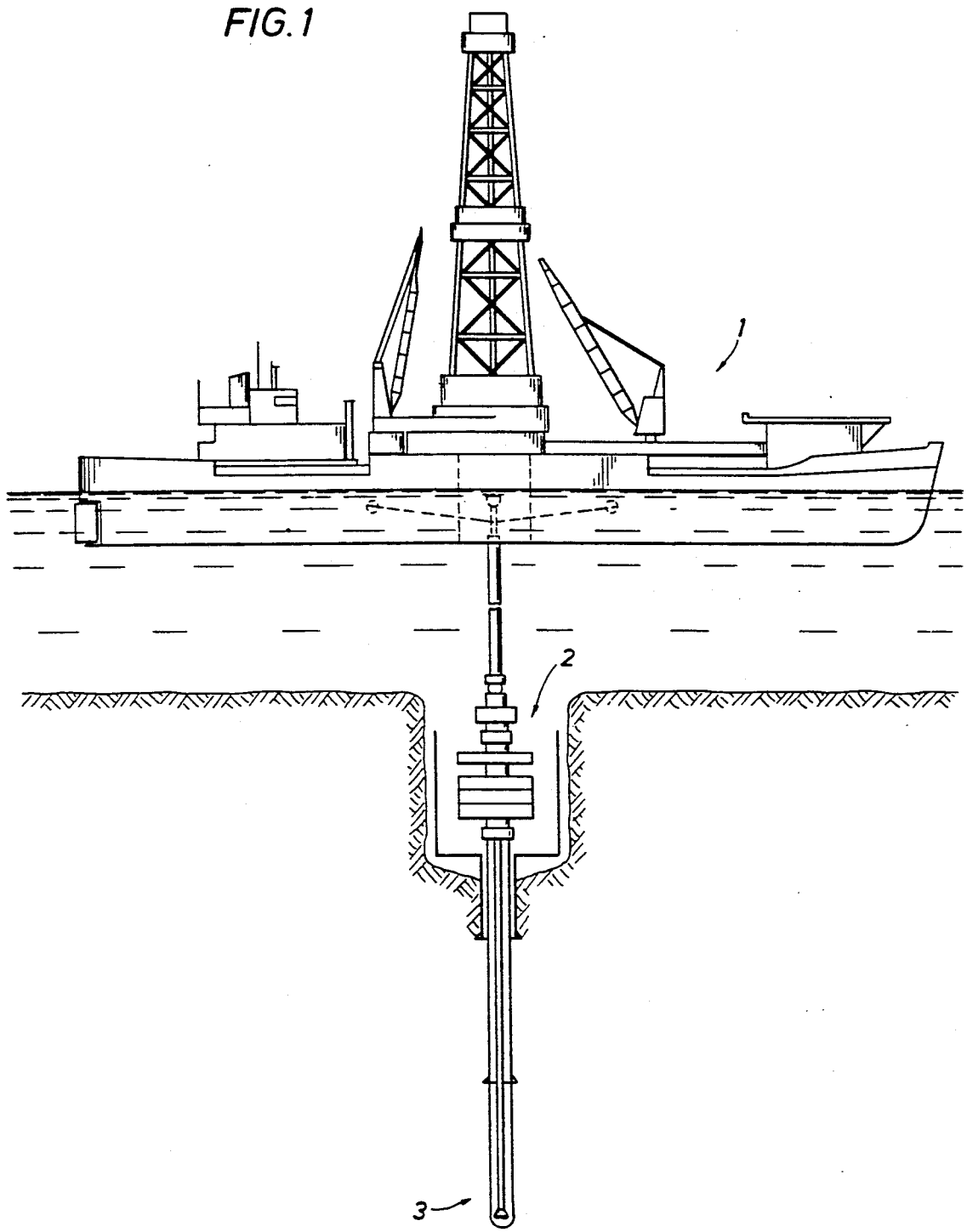
FIG. 1 shows a drilling vessel located over an offshore well-head.

The present invention pertains to a process and inhibitors for substantially preventing formation of gas hydrates in gas being produced from a subterranean gas bearing formation. The process of the present invention comprises the injection of a carrier and an alcohol (e.g., glycerol and/or glycerol-based organics), preferably along with and simultaneously with, inorganic salts, into a well and/or connected facilities and pipelines. This process preferably occurs when the drilling or work-over well is to be temporarily abandoned, for example when the wellhead is to be left by the drilling ship because of the presence of a hurricane, etc. If, in fact, a "kick" (influx of gas into the wellbore) is taken, the well must be shut in and the gas "bubble" circulated out. During this process, if the temperature is low enough and the pressure high enough, gas hydrates may form in the blowout preventor. By placing the pill in the blowout preventor hydrate formation can be prevented. This process may also occur in a producing well that is temporarily shut-in. In offshore wells, the tubing will equilibrate to ambient sea-water temperature, which is much colder than the production temperature. If the temperature is low enough and the gas pressure high enough, gas hydrates may form in the tubing. By injecting the hydrate inhibitor into the tubing, hydrate formation can be prevented.

In accordance with the present invention the alcohol (e.g., glycerol and/or glycerol-based organics), and preferably inorganic salt, preferably are injected in the form of a pill, such as in combination with a carrier such as drilling mud, into the drilling or workover well. Suitable carrier materials for injection with an alcohol (e.g., glycerol or glycerol-based organics) include either polymer based or bentonite based drilling fluids or the like. For producing wells, the inhibitor is injected into the well tubing and mixes with the produced water. The gas hydrate inhibitor of the present invention, as above mentioned, is preferably an alcohol such as an acyclicpolyol, a monoalicyclicpolyol or a cyclicetherpolyol, or combinations thereof, preferably along with an inorganic salt. Glycerol is preferred among the more common alcohols, and more especially preferred in combination with an inorganic salt such as sodium chloride, sodium bromide, potassium chloride, calcium chloride, sodium nitrate or the like. The addition of such inorganic salts to these fluids substantially improves the operating characteristics of the inhibitor and extends the range and conditions of their applicability. Among the inorganic salts, sodium chloride is preferred for environmental reasons, although other salts perform satisfactorily. The mixture of alcohol (e.g., glycerol and/or glycerol-based organics) with inorganic salt provides an unexpected synergy for the inhibition of gas hydrates. The effects to be accomplished by the present invention are realized by incorporating alcohol (e.g., glycerol and/or glycerol-based organics) at weight ratios ranging from about 1 percent to 60 percent by weight, preferably at weight ratios of about 20 percent by weight to 50 percent by weight, and with NaCl, most preferably at weight ratios of about 15 percent by weight to 26 percent by weight, based on the total weight of the water phase of the carrier.

By "glycerol-based organics," other than glycerol, it is meant either singly or in combination: Cyclic dimers of glycerol such as cis or trans 2,5-bis(hydroxymethyl) p-dioxane, cis or trans 2,6-bis(hydroxymethyl) p-dioxane, and glycerine acetal of hydracrylaldehyde; polyglycerols such as diglycerols, ($C_6O_5H_{14}$-3 isomers), triglycerols, ($C_9O_7H_{20}$-7 isomers); tetraglycerols, ($C_{12}O_9H_{26}$-11 isomers), pentaglycerols ($C_5O_{11}H_{32}$) and cyclized polyglycerols.

The alcohol of the present invention is preferably any water soluble alcohol within the following groupings or mixtures thereof. Hereinafter "poly" is used to mean two or more, "mono" is used to mean one, "cyclic" is used to mean one or more rings, "ether" is used to mean one or more ether linkages, PECP will mean either of polyetherpolycyclicpolyol, or polycyclicpolyetherpolyol.

A preferred class of alcohol components of this invention are acyclic polyols. Among acyclic polyols, preferred are those having at least 3 carbon atoms and 2 hydroxyl groups but no more than 80 carbon atoms and 60 hydroxyl groups. More preferably, the acyclic polyols of the invention have at least 9 carbon atoms and 5 hydroxyl groups but no 50 carbon atoms and 40 hydroxyl groups.

Another preferred class of alcohol components of this invention are monoalicylicpolyols. Among monoalicylicpolyols, preferred are those having 5 to 30 carbon atoms and 2 to 10 hydroxyl groups.

A most preferred class of alcohol components of this invention are cyclicetherpolyols. Among cyclicetherpolyols, preferred are those having at least 6 carbon atoms, at least 2 hydroxyl groups, and at least 2 ether linkages, but no more than 1800 carbon atoms, 450 hydroxyl groups, and 600 ether linkages. Even more preferred are cyclicetherpolyols having at least 15 carbon atoms, 5 ether linkages, and at least 5 hydroxyl groups, or at least 15 carbon atoms, at least 7 ether linkages, and at least 3 hydroxyl groups. Most preferred are cyclicetherpolyols having at least 18 carbon atoms, at least 6 hydroxyl groups, and at least 6 ether linkages but preferably no more than 1200 carbon atoms, 300 hydroxyl groups, and 400 ether linkages. Weight average molecular weights [defined infra] for the cyclicetherpolyols preferably range from 1,000 to 30,000 and more preferably from 5,000 to 20,000. Among the cyclicetherpolyols, monocyclicdietherdiols are preferred and polycyclicpolyetherpolyols are more preferred.

Nonlimiting examples include monomers, oligomers and telomers of polyhydric alcohols (or their precursors, or combinations thereof) such as glycerol, telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, 1,5,6,9-decanetetrol, 1,2,4,5-cyclohexanetetramethanol, 1,2,4,7-heptanetetrol, 1,2,3,5-heptanetetrol, 4,4-dimethyl-1,2,3-pentanetriol, 1,3,4-cycloheptanetriol, 1,2,3-pentanetriol, 1,2,4-pentanetriol, 2,3,4-pentanetriol, 1,1-cyclopentanediol, 1,2,3-cyclopentanetriol, 1,2,3-hexanetriol, 1,2,4-hexanetriol, 1,2,3,4-hexanetetrol, 1,2,4-cyclohexanetriol, 1,2,5-cyclohexanetriol, 1,2,3,4-cyclohexanetetrol, 1,2,3,5-cyclohexanetetrol, sorbitol, mannitol, and copolymers of ethylene glycol and propylene glycols with the preceding alcohols.

Cyclicetherpolyols can be obtained, for example, by extraction from saline water byproduct streams arising from the manufacture of epoxy resins, e.g., by reaction of epichlorohydrin and bisphenol A as described in U.S. Pat. Nos. 4,560,812 and 4,599,178, which are incorporated hereinto by reference thereto. The bottom stream obtained from the distillation of synthetic and natural glycerine, usually referred to as footstill bottoms, is also a convenient source of polycyclicpolyetherpolyols of the type referred to herein. In addition, a direct synthesis route is described hereinafter. The following structures are nonlimiting examples of this class of polyols. In order to obtain cyclic diethers, the number of moles of water expelled must be at least equal to the number of moles of glycerol (or other polyhydric, at least trihydric, polyol) used in the reaction mixture.

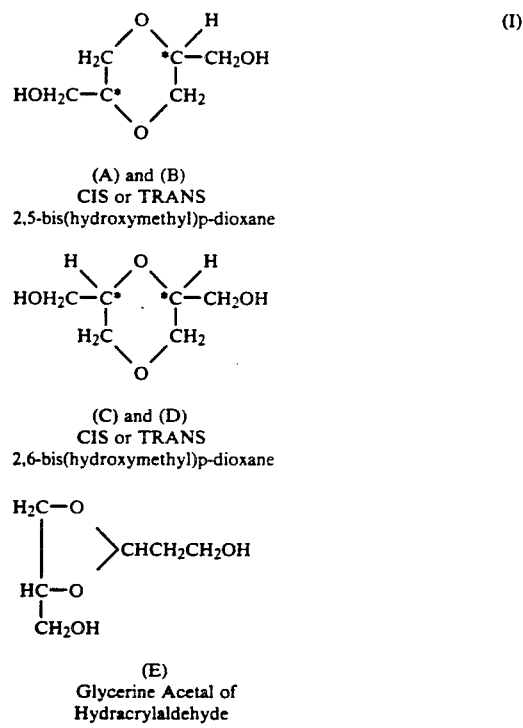

(A) and (B)
CIS or TRANS
2,5-bis(hydroxymethyl)p-dioxane (C) and (D)
CIS or TRANS
2,6-bis(hydroxymethyl)p-dioxane (E)
Glycerine Acetal of
Hydracrylaldehyde In structures A through D, CIS and TRANS refer to the stereoisomerism of the carbon atoms marked by an asterisk. Structures A through D can also be called bis-hydroxymethyl 1,4-p-dioxanes.

Polycyclicpolyetherpolyols may in turn be prepared by polycondensation of compounds such as (A) through (E) supra in chemical processes which ar accompanied by significant expulsion of water molecules from the polymerizing compounds. The number of ether linkages equals the number of water molecules expelled. Taking (C) or (D) supra as the building unit, the lowest molecular weight structure containing two such units is Structure (II) infra, containing two terminal hydroxyl groups, and five ether linkages. Structure (11) is formed by condensation from glycerol molecules with the expulsion of five water molecules.

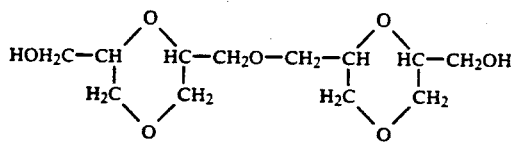

(II)

This structure is a di-cyclicpoly (or penta) etherdiol, and can be called di-bis-hydroxymethyl 1,4-p-dioxane.

Polycyclicpolyetherpolyols also can be formed by further condensation or polycondensation of Structure (II) with itself, or with itself and with polyhydric, at least trihydric, monomers, e.g., glycerol monomers. Dimerization of structure (II) with expulsion of one mole of water yields:

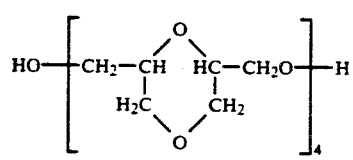

(III)

Copolycondensation of four structure (I) units with itself and with one polyhydric (at least trihydric) molecule, e.g., a glycerol molecule, can yield structure (IV) infra and its isomeric equivalents:

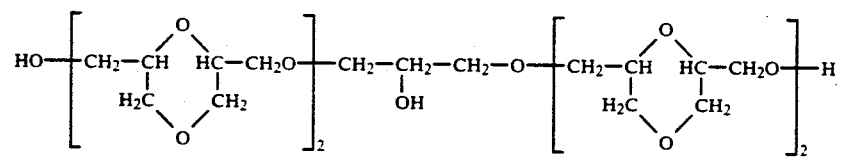

(IV)

Analogous structures can be obtained from structures (I) (A), (I) B, and (I) E supra by polycondensation. Structures based on (E) supra will have 5-membered rings. Spectroscopic techniques cannot conveniently distinguish between the 5 or 6 membered rings.

Structure (IV) contains twelve ether linkages, three hydroxyl groups, and four six-membered cyclic diethers, and is formed by the polycondensation of nine glycerol molecules by the expulsion of twelve water molecules. The cyclic diether units and the polycondensed glycerol units, or other polyhydric (at least trihydric) subunits, occur randomly in the structure. Disregarding the order of occurrence, a general chemical composition formula representative of all of these structures is:

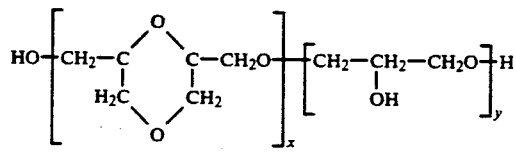

(V)

where $x \geq 1$ and $y \geq 0$.

Preparation of cyclicetherpolyols for the practice of this invention can be obtained by direct synthetic route. For example, starting with glycerol, chlorohydrin can be produced, which upon treatment with NaOH at elevated temperatures yields glycidol. This molecular structure cyclicizes at still higher temperature to yield bis hydroxymethyl 1,4-p-dioxane.

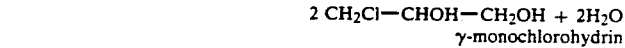

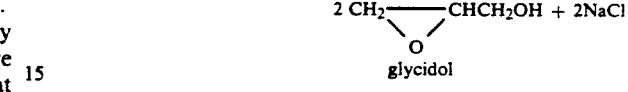

bis hydroxymethyl 1,4 p-dioxane
(VI)

To make the higher molecular weight components from bis hydroxymethyl-1,4 p-dioxane and its isomers (I) (A-E) supra, the cyclic dimer is heated with acid (e.g., sulfuric acid) or basic (e.g., sodium acetate) catalyst while maintaining low pressure to facilitate continuous removal of the water being expelled during the condensation process. The rate of dehydration increases with increasing temperature, but excessive temperatures should be avoided to eliminate polymerization to intractable mixtures. Also it is essential to maintain an oxygen-free atmosphere over the solution while the reaction proceeds to avoid excessive oxidation and carbonization. Temperatures in the range from 150° C. to 350° C. can be employed with pressures ranging from subatmospheric to several atmospheres. The vapor pressure of the water-free organic mixture is reduced as the average molecular weight increases by condensation. However, the formation of water increases the pressure of the reactive mixture, and allows easy removal by continuous distillation of the produced water. The extent of polycondensation can be monitored by measuring the weight of produced water. For best results the moles of water expelled should be at least equal to the starting number of polyhydric (at least trihydric) moles, e.g., glycerol moles. In a preferred composition the number of moles expelled by polycondensation should be between 20% and 70% greater than the number of the polyhydric, or at least trihydric, moles of alcohol in the reacting mixture. For example, from a starting feed of 9000 grams of glycerol, 2200 to 2900 grams of water can be removed during the polycondensation process or about 24% to 32% of the initial glycerol weight.

The monomeric units which ca enter into the polycondensation reactions to yield desirable polyethercyclic polyols are alcohols containing at least three hydroxyl groups per molecule of which at least two are vicinal. Thus, glycols of any molecular weight do not meet the requirements of this most preferred embodiment. On the other hand, triols ar quite suitable. Examples are butane triols, such as 1,2,4butanetriol, pentane triols, such as 1,2,3 pentanetriol, etc. An important class of polyhydric alcohols with straight carbon chains and four or more hydroxyl groups, called sugar alcohols, can also be used in preparing additive formulations containing cyclic polyethers. Sorbitol and mannitol are two such well known polyhydric alcohols.

A monomer of the structure:

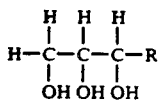
(VII)

will yield several structures, one of which is illustrated by:

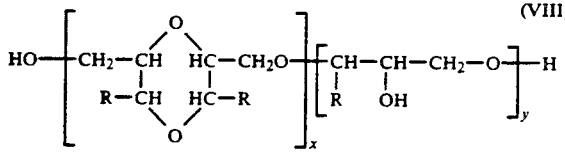
(VIII)

The R group may itself be a group containing hydroxymethyl groups, which would in turn increase the potential for intermolecular condensation by expulsion of additional moles of water, and would increase the facility with which high molecular weight cyclic ether structures are obtained.

Examples of cyclicdietherpolyols can be obtained from trihydric alcohols with more than three carbons such as the following:

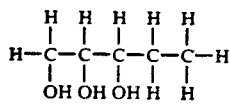
(IX)

1,2,3-Pentanetriol

The following monocyclicdietherdiols of pentanetriol are obtained from Structure IX in accordance with the methods described supra:

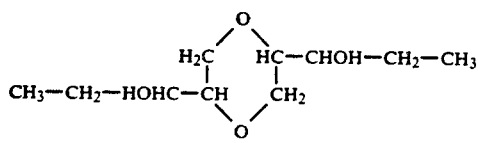
(A)

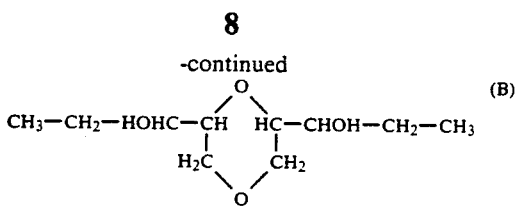
(B)

Both dimers (A) and (B) are obtained from Structure IX by reacting at carbons 1 and 2.

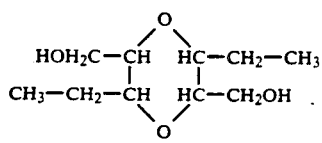
(C)

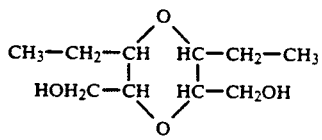
(D)

Both dimers (C) and (D) are obtained by reacting Structure (IX) at carbons 2 and 3.

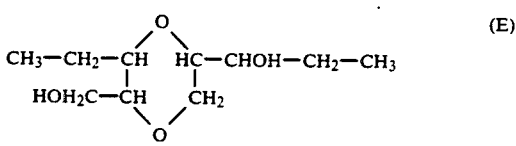
(E)

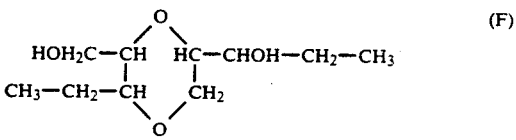
(F)

Dimers (E) and (F) are obtained from (IX) by reacting at 1,2 and at 2,3 kpositions.

(X)

Further polycondensation of the cyclicetherdiols supra will yield polycyclicpolyetherpolyols with structures which depend on which hydroxyl groups are involved in the condensation reaction. For instance, reaction between Structures (X) A supra and (X) F supra will yield (XI) infra a dicyclicpentaetherdiol of pentanetriol as follows. Obviously, a large number of possible polycondensed structures exist.

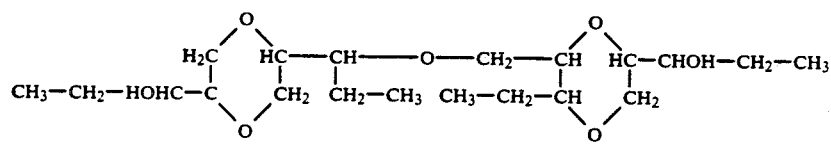
(XI)

Two examples of polyglycerol structures which can undergo cyclization are molecules XII and XIII below:

(XII)

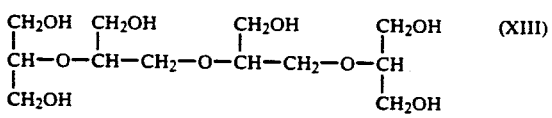

The general formula of the cyclized polyglycerols is poorer in oxygen and hydrogen than the general composition $C_{3x}O_{2x+1}H_{6x+2}$. Cyclization of XII yields XIV, and cyclization of XIII yields XV.

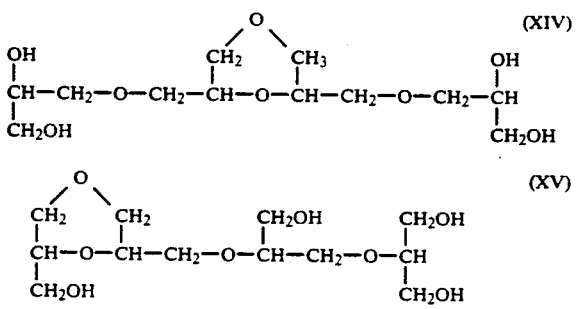

The molecular weight of a typical composition which was found to provide excellent properties in the drilling fluid of this invention upon addition to a level of 2% w, had molecular weight parameters as determined infra. Number average molecular weight $M_n$ is shown by the following:

$$M_n = \frac{\sum_i n_i M_i}{\sum_i n_i} \geq 1230$$

This is the average molecular weight obtained when the total weight of the sample is divided by the number of molecules in the sample. This molecular weight determines the effect of the sample on the osmotic pressure and hence, the effect of the sample on the freezing point or other colligative properties of the total mixture.

The weight average molecular weight was found to be:

$$M_n = \frac{\sum_i n_i M_i^2}{\sum_i n_i M_i} \geq 10550$$

This $M_w$ value represents GPC results expressed in terms of PEG numbers obtained by using two Ultrahydrogel columns, a 250 angstroms column and a 120 angstroms column connected in series using water as solvent at 30° C.

This molecular weight, weighs molecules proportionally to their molecular weight in the averaging process; that is, the molecular weight $M_i$, is multiplied by the weight $n_i M_i$ of material of that molecular weight rather than by the number of molecules. This type of average reflects the effect of the sample on those properties which depend on the size of the individual molecules, such as effectiveness in light scattering, or ability of the molecule to penetrate into small openings. Thus, a high $M_w$ would be beneficial if penetration of the molecules into the interplanar structure of layered clays in the formulation is to be avoided. While the invention is not limited by this theory, it is believed that such a property minimizes the swelling of clay components in the wellbore, thereby improving wellbore stability.

The ratio $M_w/M_n$ is also an indication of the spread or polydispersity in the molecular weight of molecules present in the sample, and is by definition $M_w \geq M_n$. This ratio is 8.6 for the most preferred formulation, PECP.

In accordance with a highly preferred embodiment of the invention, polycyclicpolyetherpolyols having superior characteristics are produced by thermal condensation of glycerol in distillation apparatus under conditions which allow water to be removed overhead, but not substantial amounts of glycerol or its dimers or trimers. A catalyst is required, preferably an alkali metal hydroxide, more preferably sodium hydroxide, in a preferred concentration of 0.5-1.5 percent by weight of the reaction mixture, and preferably including an alkali metal acetate, more preferably sodium acetate, in like or smaller amounts.

The mixture is heated, preferably between 150 and 350 mm Hg and free water is distilled off continuously, allowing the equilibrium limited reaction to proceed further and to completion. The glycerol will then begin to rise in temperature to about 210°-230° C. at 120-180 mm Hg, at which temperature the mixture refluxes, indicating the onset of reactions which produce water by condensation of the glycerol. By maintaining the pressure at up to 180 mm Hg, the glycerol, which may volatilize along with the water, is condensed in an overhead condensor, and preferably cooled by a coolant. The glycerol and its linear and cyclic dimers which form in the course of the volatilization process, are condensed and refluxed to the reacting mixture. Gradually the procedure results in an increase in the boiling point of the mixture, brought about by the continuous removal of water of condensation and by the increase of the molecular weight of the mixture.

As the degree of polymerization increases, and the water removed from the glycerol feed increases, the pressure over the mixture is gradually decreased externally, either in a continuous, preferably gradual mode, or at selected reaction temperatures. For example, it is possible to reduce the pressure to 120 mm Hg when the mixture reaches 250° C. at a pressure of 180 mm Hg. Alternatively, it is possible to control the pressure to diminish gradually by a known mechanical means.

The preferred way to achieve extensive dehydration without undesirable crosslinking and gelation of the polycyclicpolyetherpolyols is by the addition of small amounts of glycerol, at a later stage of the reaction, by example, when the reaction medium temperature has reached 270°-280° C. at a pressure of 50-100 mm Hg, preferably 60-90 mm Hg. Upon addition of 2-6 percent by weight of glycerol, basis final weight of glycerol added, at a point after removal, for example, of 0.8 moles of water per mole of glycerol, a drop in the temperature of the reaction mixture occurs, the drop being several degrees Centigrade or Fahrenheit. The drop is caused by the lower temperature of the glycerol being added, but more importantly indicates the endothermic nature of the reaction between glycerol molecules, or between glycerol molecules and added glycerol molecules, or between added glycerol molecules with reactive sites in the polymerizing mixture. For better effectiveness, the glycerol may be presaturated with alkaline metal hydroxide, e.g., sodium hydroxide.

Upon continued input of heat from an external source, the temperature of the reacting mixture rises to the previous highest level, or to a higher level, or to a somewhat lower level than a first high temperature, depending upon the molecular weight distribution of polycyclicpolyetherpolyols in the mixture. This procedure of incremental glycerol addition can be repeated a number of times, three being a convenient number. With three additions of glycerol the experimental reaction time between onset of reaction and its completion usually takes 5-10 hours depending on the temperature and pressure of additions and the amount of glycerol added each time. As the reaction approaches 85 percent completion it is suitable to combine glycerol additions with further reductions of pressure, going down to 30 mm Hg or even lower. As the reaction approaches completion, it turns from being highly endothermic to being thermally neutral, and at a dehydration approaching and exceeding 1.2 moles of water per mole of glycerol, it can become exothermic. This is a reflection of the propensity of the mixture to undergo rapid cross-linking of the complex polycyclicpolyetherpolyol structures. In order to avoid the occurrence of such an undesirable crosslinking reaction, it is preferred to buffer the reaction by adding a small amount of glycerol, for example, 0.3-0.9 percent or up to 1.5 percent by weight total. Preferably there is added 0.5 percent by weight of glycerol at a selected time or preferably at a point where the reaction is 96 percent complete, after removal of 1.12-1.15 moles of water per mole of glycerol in the reaction medium.

It has been found that the addition of minor amounts of epoxy resins to the reaction mixture are beneficial. Preferred epoxy resins are diglycidyl ethers, triglycidyl ethers, and tetraglycidyl ethers which, in the reacting glycerol medium, result in formation of higher molecular weight polycyclicpolyetherpolyols which substantially improve properties in connection with drilling fluid performance. Polycyclicpolyetherpolyols resulting from this process are characterized by binodal molecular weight distribution, $M_w$ in excess of 50,000, said $M_w$ being determined in a three-column gel permeation chromatography, and being 0.5 to 10% w epoxy structures. The polycyclicpolyetherpolyols are further characterized by molecular structures which are no more than 20% free of associated cyclic formations.

Experimental results show that the impact of using multifunctional glycidyl ethers on the value of $M_n$ and on the performance, particularly as regards swelling of clays when the invention is used as a drilling fluid additive, is truly significant. Thus, when using 3.0% w Epon 828 (difunctional glycidyl ether) and 3.0% w Epon 1031 (tetrafunctional glycidyl ether) tradenames of Shell Oil Company, the $M_w$ values are correspondingly 78,015 and 151,000, and the swelling inhibition is the highest with Epon 1031, with good performance on fluid loss and on dispersion. The immediately preceding $M_w$ values are expressed in terms of true molecular weight in units of Daltons by using three Ultra-hydrogel columns, a Linear column, a 250 angstroms column and a 120 angstroms column in series, using water as the solvent at 30° C.

Most preferred samples of polycyclicpolyetherpolyols with beneficial effects on the properties of drilling fluids have been found to have $M_n$ values in the order of about 150 to about 2000 and $M_w$ values in the order of 1500 to 12000. The $M_n$ and $M_w$ values for POLS are 130-145 and 700-875, respectively, but POLS (see below) is superior to many other alcohols in carrying out the purposes of this invention.

Structural determination of mixtures using Mass Spectroscopy has yielded x values (see structures V and VIII supra) of 1 to 4 in portions of the sample not exceeding 14 glycerol units, thus indicating that in a significant portion of the sample $x \geq y/2$, although the invention is not limited to this theory. This procedure is limited with regard to the molecular weight of structures that it can determine, to molecules with about 50 carbon atoms.

The effectiveness of adding a commercially available polyol mixture (herein referred to as POLS) or polyetherpolycyclicpolyols prepared by Shell Chemical Company (herein referred to as PECP) are shown for different drilling fluid combinations. The POLS sample tested herein was analyzed to be 46.8% propylene glycol with 16.6% w linear dimers, 17.5% w linear trimers, 3.8% w linear tetramers, 3.2% w linear pentamers, and 0.88% w linear hexamers of propylene glycol, with less than 0.5% w cyclics, 11% w water, and 0.2 to 0.5% w Na+ and K+. A typical PECP sample tested was 0.16% w glycerol, 11.4% w p-dioxanes, 1.1% w cyclic trimers of glycerol 4% w cyclic and dicyclic tetramers of glycerol, 2% w cyclic and dicyclic pentamers of glycerol, 2% w cyclic and dicyclic pentamers of glycerol, 2% w dicyclic and tricyclic hexamers of glycerol, 2% w dicyclic and tricyclic heptamers of glycerol, 3% w dicyclic and tricyclic octamers of glycerol, 4% w dicyclic and tricyclic nonamers of glycerol, 27% w polycyclicpolyetherpolyols having at least 30 carbon atoms and at least 2 cyclic ethers per molecule, 37.5% w water, and 0.5% NaCl.

Water present in gas being produced from a subterranean formation is also necessary for gas hydrate formation. Such gas frequently is saturated with water and formation of gas hydrates is a significant problem in the event that large amounts of free gas enter the wellbore, which is a common occurrence during a well "kick." Hydrates form over a wide range of temperatures up to about 25° C. and are a complex, solid compound of hydrocarbons and water. Gas hydrates can form to an extent which plugs the wellhead. This may occur when the drilling or workover well is temporarily abandoned as for example when a hurricane is in the area and the drilling ship must move to another area, thereby temporarily disconnecting itself from the wellhead. For a producing well, production may be temporarily shut-in for maintenance. When this occurs, the fluid left in the drill string and annulus, may contain water and be susceptible to forming gas hydrates. Accordingly, the present invention requires injecting a pill into the drill string and annulus of a drilling well so that the prevention of the occurrence of hydrates is thereby avoided. Alternately, the pill may be pumped into the vicinity of the subsea wellhead through the blowout preventor choke or kill line(s). The pill suitable for use in practicing the present invention is formulated so that drilling mud or the like carries the hydrate inhibitor into the well and is exposed to the gas to effectively prevent the formation of gas hydrates. In accordance with the present invention, the proportion of mud in relation to the alcohol (e.g., glycerol and/or glycerol-based organics) and preferably inorganic salts, may be formulated to possess varying degrees of activity. Thus, the more mud which is utilized in proportion to alcohol, the less hydrate inhibition is realized. On the other hand, the incorporation of more salt also increases the inhibitory effects of the pill of the present invention. The degree of inhibition of the pill of the present invention is dependent upon several parameters, including, the chemical composition of the pill, the quantity of the pill, and the selection among alcohols, in addition to inorganic salt.

For a producing well, the amount of hydrate inhibitor injected depends upon the fluid pressure, ambient sea water or soil temperature and the amount of gas shut in the tubing. These conditions also determine the selection of the hydrate inhibitor chemicals, the composition and whether inorganic salt is added.

The Tables and Figures hereinafter described further illustrate the parameters and characteristics of the invention:

Table 2 tabulates the fitting constants corresponding to a 4th order polynomial fit to the freezing point data (Table 1). The CRC handbook of Chemistry and Physics was used for the pure NaCl and pure glycerol freezing point data. Experimental measurements were regressed for the mixed inhibitor cases. For pure NaCl and glycerol, the freezing points in Kelvin were fitted to the mole fractions of NaCl and glycerol respectively. For the mixed inhibitor cases, the freezing points in degree Fahrenheit were fitted to the weight percent of glycerol in NaCl/glycerol/water.

FIG. 2 is a plot of the freezing point data versus weight percent of glycerol in water. The solid curve is a best-fit curve based upon a 4th order polynomial regression fit to literature freezing point data (CRC Handbook of Physics and Chemistry). The measured values scatter around the best-fit curve. The experimental measurements compare well at low concentrations of glycerol in water but deviate at high concentrations of glycerol in water (Table 1). The fitting constants are listed in Table 2. The experimental points were measured by the ASTM procedure D-1177.

FIG. 3 also depicts gas hydrate inhibition with glycerol. As the weight percent oi glycerol in water increases, the gas hydrate pressure-temperature (P-T) locus shifts to the left. A shift of the P-T locus to the left implies a much larger range of P and T values for hydrate-free operation. Hydrates form at P-T values lying to the left of the P-T locus; the P-T region to the right is hydrate-free.

FIG. 4 depicts a plot of the freezing point data versus weight percent of NaCl in water. The solid curve is a best-fit curve based upon a 4th order polynomial regression fit to literature freezing point data (CRC Handbook of Physics and Chemistry). The measured values scatter around the best-fit curve. The experimental measurements compare well with the predicted values (Table 1). The fitting constants are listed in Table 2. The experimental points were measured by the ASTM procedure D-1177.

FIG. 5 depicts gas hydrate inhibition with NaCl. As the weight percent of NaCl in water increases, the gas hydrate pressure-temperature (P-T) locus shifts to the left. A shift of the P-T locus to the left implies a much larger range of P and T values lying to the right of the P-T locus; the P-T region to the right is hydrate-free.

Figure 7:
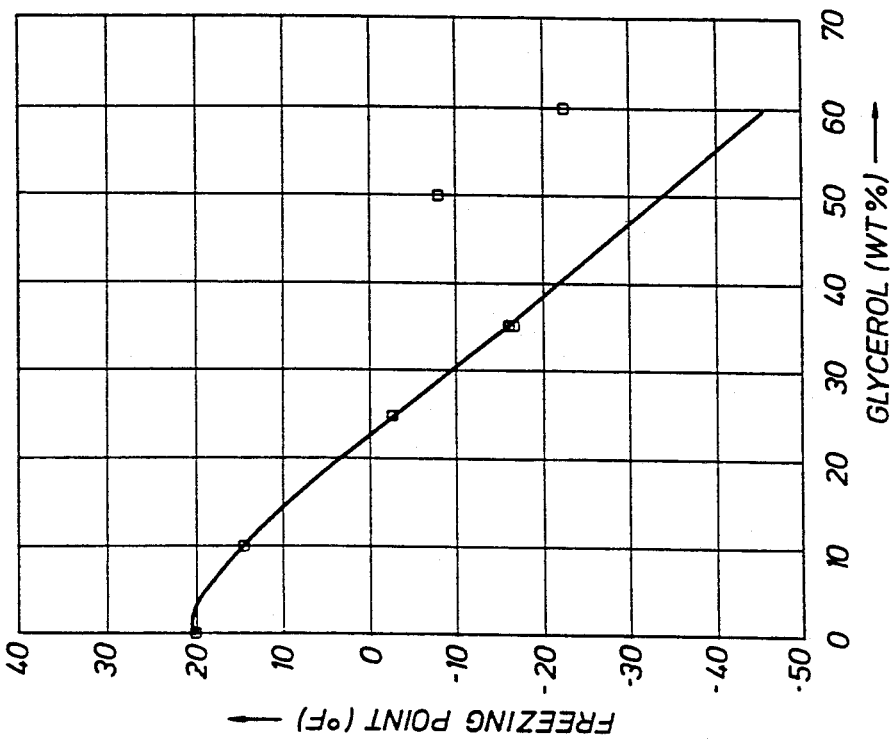
Figure 6:
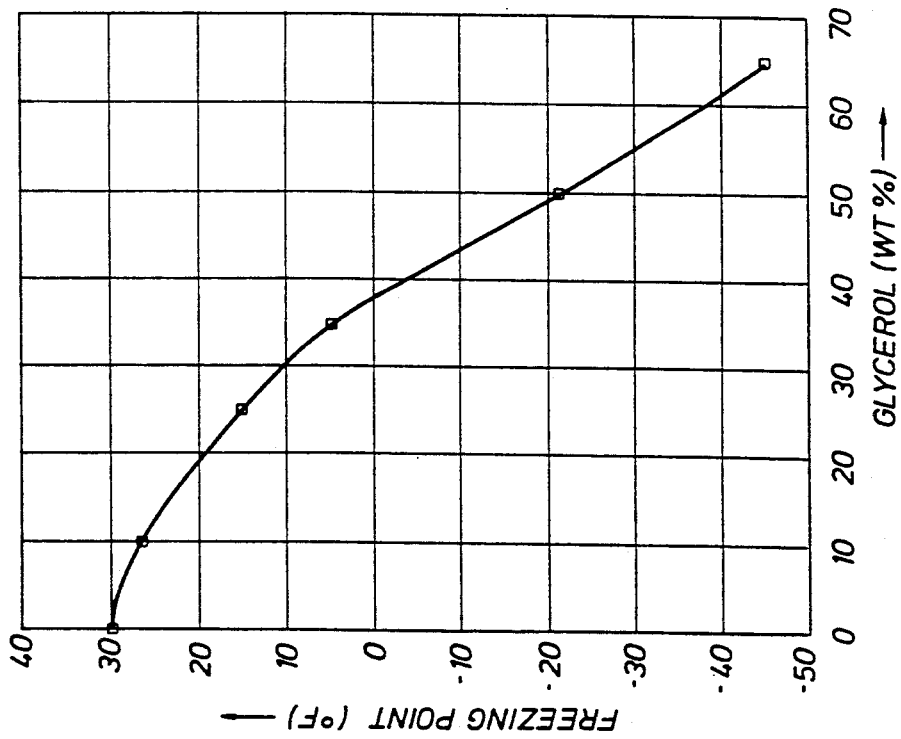
Figure 8:
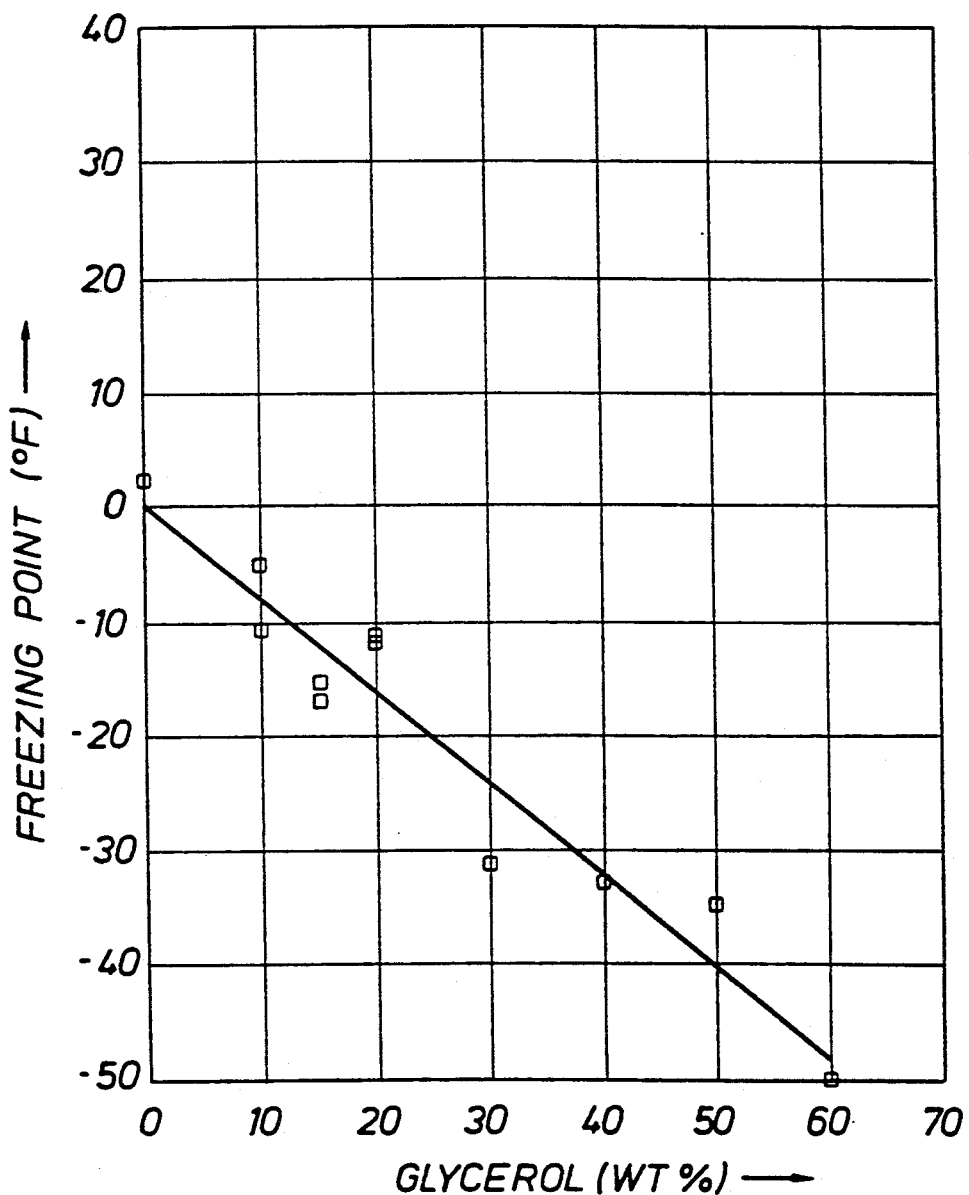

FIGS. 6, 7 and 8 are plots of the freezing point data when mixed inhibitors consisting of 2.5%, 10%, and 20% NaCl respectively, and different amounts of glycerol were added to water. The experimental points were measured by the ASTM procedure D-1177. The solid curve is a smooth fit of the data. A 4th order polynomial was used for the regression and the constants are tabulated in Table 2. The experimental measurements at high glycerol concentrations are suspect (Table 1). They were ignored in the fitting. For the 20% NaCl/glycerol mixtures the scatter in the experimental data justified only a linear fit of the freezing point with weight percent glycerol in water.

Figure 9:
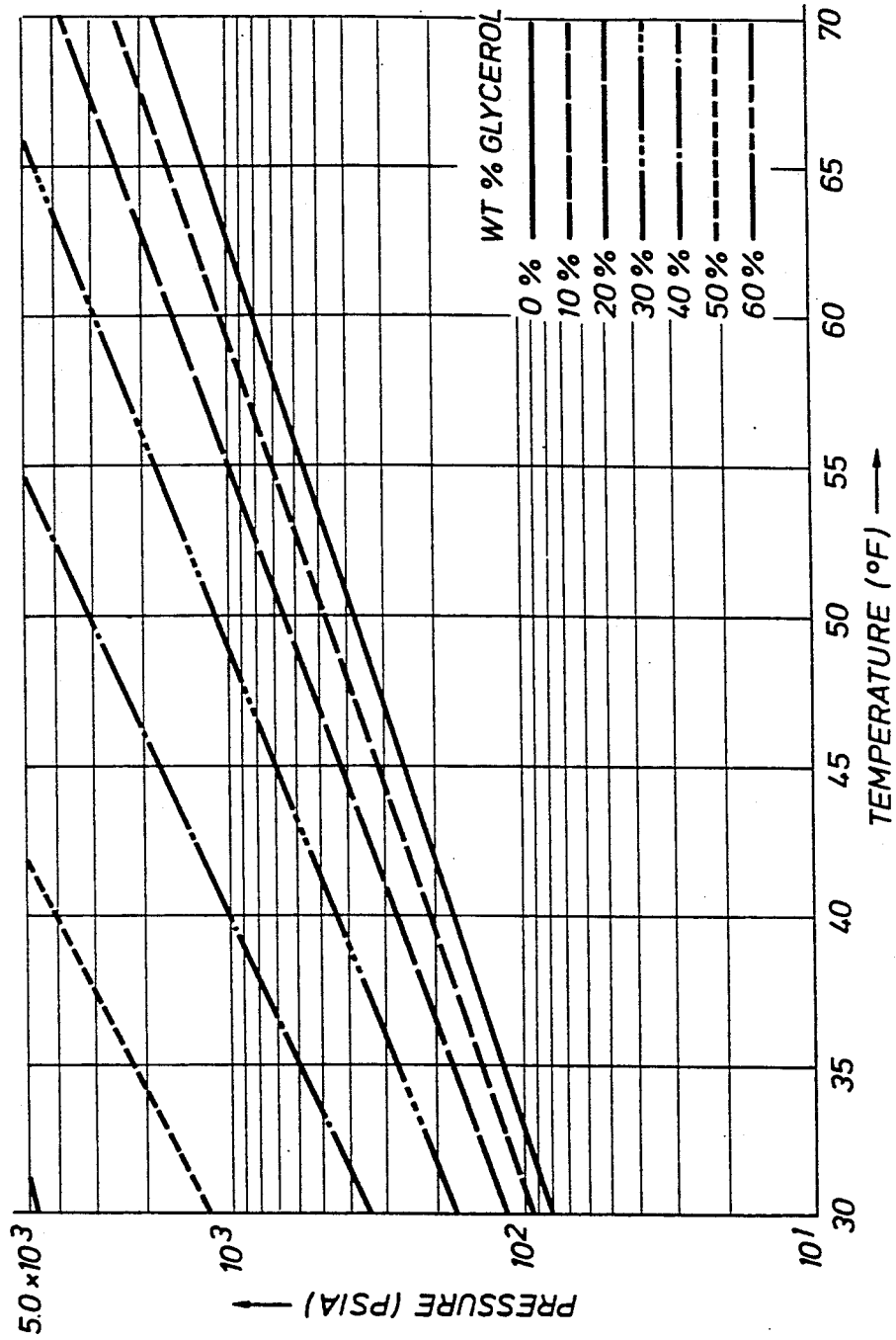
Figure 10:
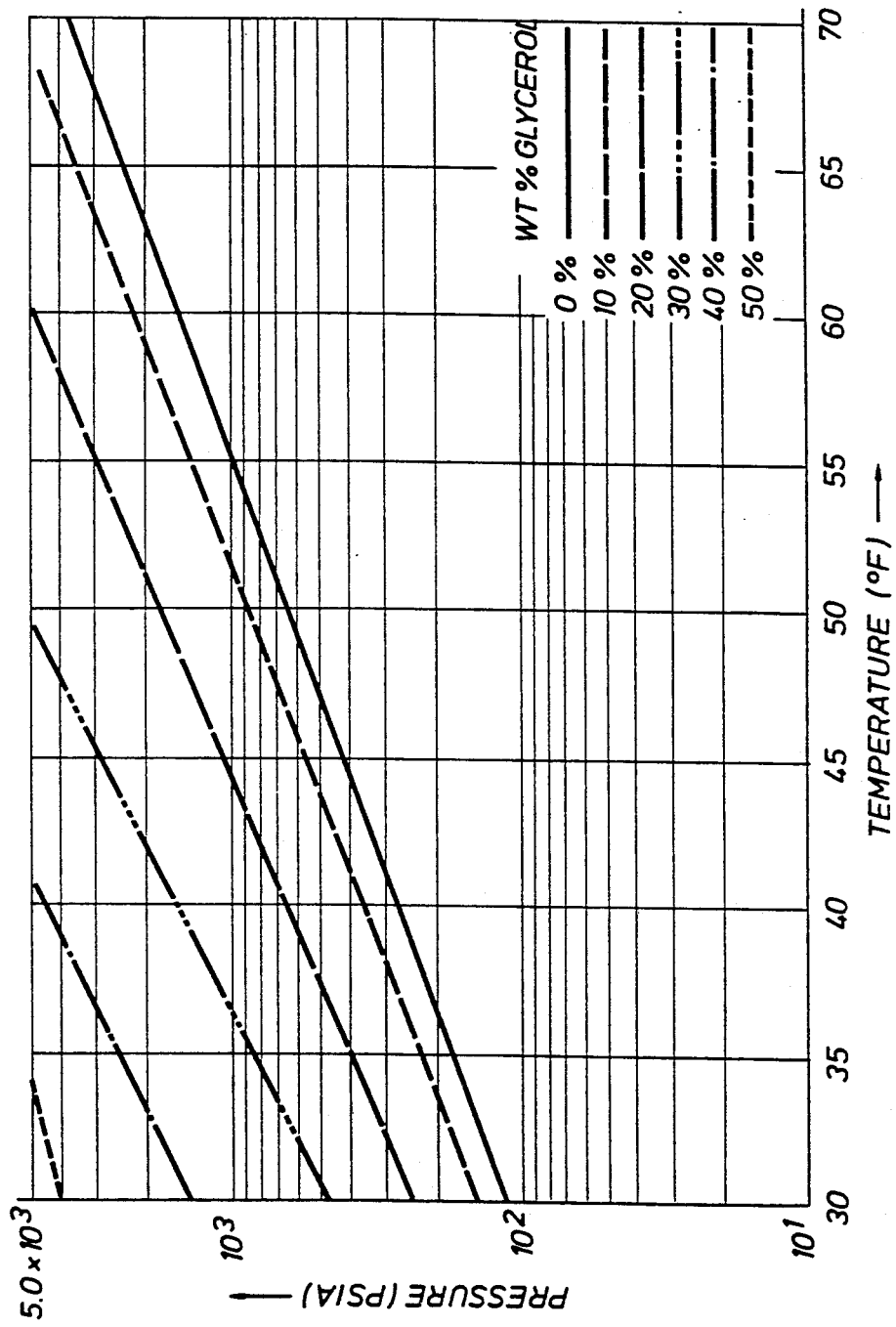
Figure 11:
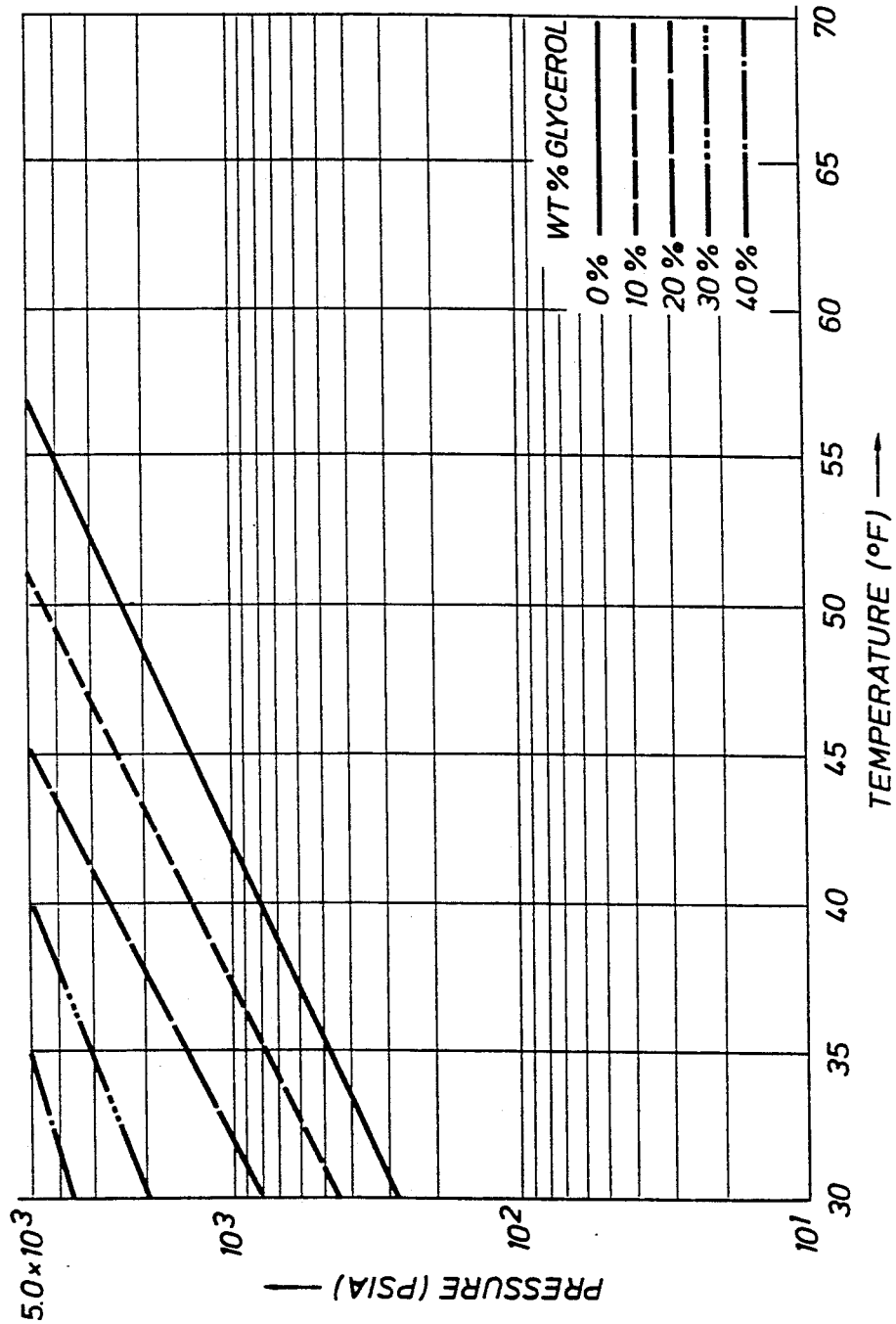

FIGS. 9, 10 and 11 show gas hydrate inhibition with mixed inhibitors. These figures represent fixed NaCl loadings of 2.5% (wt), 10% (wt) and 20% (wt), respectively. In each case, the NaCl is mixed with different concentrations of glycerol ranging from 0% to 60% by weight. It is clear that the mixture suppresses hydrates.

Table 3 lists the gas composition used for the gas hydrate formation/inhibition simulation. In addition it provides the hydrate formation temperatures for 3 isobars—1000, 3000 and 4500 psia—using various inhibitors. The inhibitors include pure salt, glycerol and mixtures of salt and glycerol. The results suggest that the mixture of the two inhibits hydrate formation significantly more than the individual components.

In Tables 4, 5 and 6 results are shown for 2.5% (wt), 10% (wt) and 20% (wt) of salt in combination with 10% (wt), 35% (wt), and 60% (wt) glycerol that illustrate that the mixture of glycerol and NaCl provides synergistic protection against hydrate formation. At very low salt and glycerol concentrations, there is little or no synergy (Table 4). At high salt and high glycerol concentrations the freezing point data is suspect (Table 6). The reduced synergy at these concentrations may not be meaningful. At salt concentrations between 5% (wt) to 25% (wt), and the glycerol concentrations between 10% (wt) and 40% (wt) there is definite synergy on mixing the two inhibitors.

It is this unique combination of salt plus alcohol that enables the pill formulation to fulfill a unique application in drilling wells that has benefit without damaging the drilling fluid system or polluting the oceans. Other salts and alcohols are viable alternatives. However, this combination has been shown to be compatible with other mud systems and to be environmentally safe.

Table 7 lists 9 formulations of pills at 14.0 ppg. The rheological properties were measured at 3 different temperatures (4°, 4° and 75° F.) for each formulation. Formulations 4 to 9 are preferred, depending upon the capabilities of rig pumps and the amount of protection needed against gas hydrates. Two pill formulations (#3 and #7) were analyzed by bioassay testing. Results indicate that the pill formulations will satisfy EPA permit requirements for use in the Gulf of Mexico.

Table 8 documents contamination studies made with the pill. The purpose was to determine if the pill once spotted and removed, would cause any significant changes in the mud system. For this test a field mud from Mississippi Canyon area, Gulf of Mexico (20% NaCl, Polymer mud system) was chosen. Table 8 lists the percent pill added to mud (by volume) and the rheological properties at 75° F. No significant changes in the rheological properties were observed. However, the fluid loss property was improved.

As an additional test, different amounts of glycerol (percent by volume) were added to the Mississippi Canyon mud to study the effect on the rheological properties (Table 8). The yield point and gel strengths decreased and the API fluid loss control improved.

Table 9 verifies that the pill can be formulated with a field mud by mixing directly with glycerol, followed by weighting the pill to the appropriate weight with barite. In Table 9, the field mud was diluted 10, 20, 30 and 40 percent with pure glycerol, then weighted with barite to the original mud density. The properties of the glycerol containing mud are similar to the original mud with 0 percent glycerol.

Figure 12:
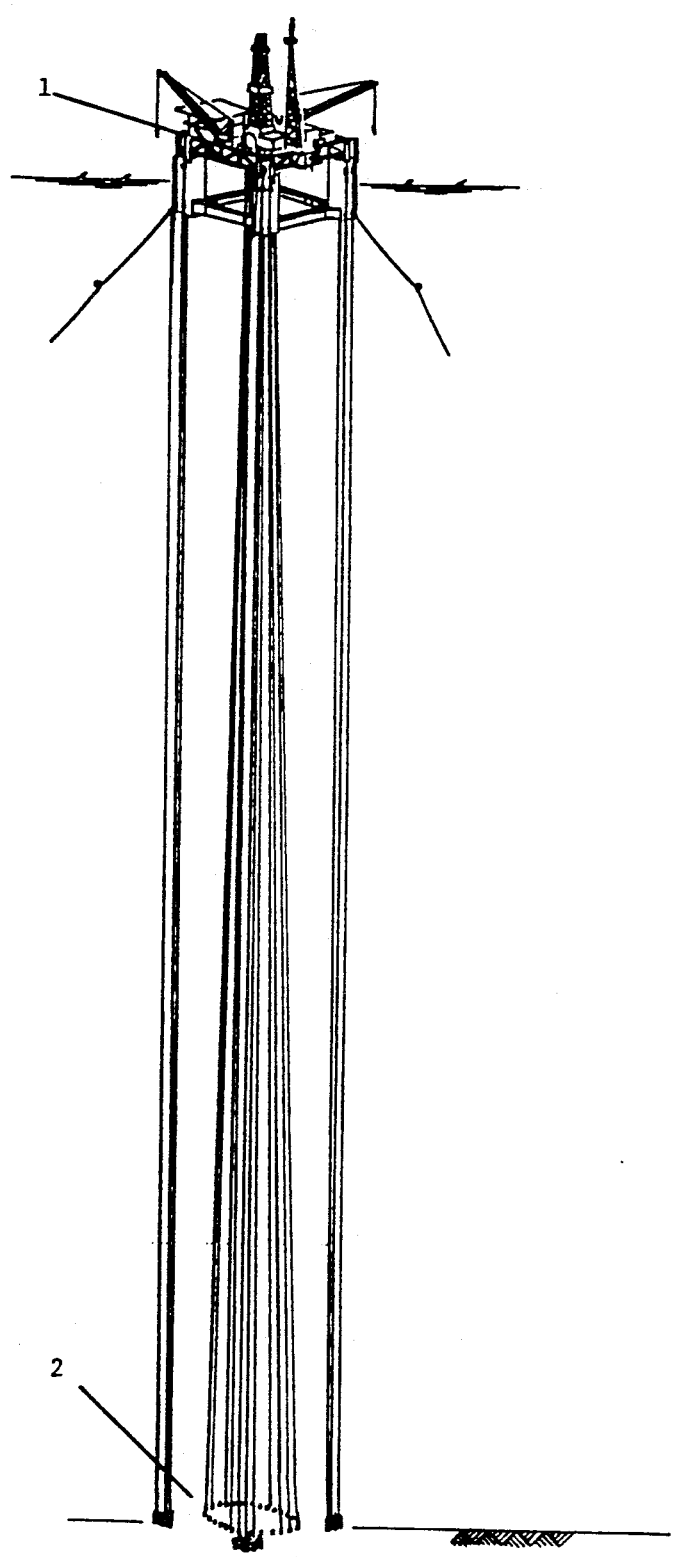
FIG. 12 shows a tension leg platform.

FIG. 12 shows a tension leg platform in about 3,000 feet of water. The hydrate inhibitor is injected either in the connected facilities/pipeline 1 and/or in the tubing 5 above or below the mud line 2.

TABLE 1

Freezing Point Depression Data

| NaCl (%) | Experimental (Temperature °F.) | Literature (Temperature °F.) | Glycerol (%) | Experimental (Temperature °F.) | Literature (Temperature °F.) | 20% NaCl/ Glycerol % Glycerol | Experimental (Temperature °F.) |
|---|---|---|---|---|---|---|---|
| 2.5 | 30.5 | 29 | 10 | 27.5 | 29.0 | 10 | −5.0 |
| 5.0 | 28.0 | 27 | 15 | 24.5 | 25.0 | 20 | −11.5 |
| 10.0 | 21.0 | 20 | 20 | 23.0 | 23.0 | 30 | −31.0 |
| 15.0 | 10.0 | 12 | 35 | 26.5 | 14.0 | 40 | −33.0 |
| 20.0 | 1.0 | 2 | 50 | −13.5 | −9.4 | 50 | −35.0 |
| 26.0 | −3.0 |  | 65 | −25.5 | −51.0 | 60 | −50.0 |

| NaCl (%) | Glycerol (%) | Temperature (%) | NaCl (%) | Glycerol (%) | Temperature (%) | NaCl (%) | Glycerol (%) | Temperature (%) |
|---|---|---|---|---|---|---|---|---|
| 2.5 | 10 | 26.0 | 10 | 10 | 14.5 | 20 | 10 | −10.5 |
| 2.5 | 25 | 15.0 | 10 | 25 | −2.5 | 20 | 15 | −15.0 |
| 2.5 | 25 | 15.0 | 10 | 35 | −16.5 | 20 | 15 | −17.0 |
| 2.5 | 35 | 5.0 | 10 | 35 | −16.0 | 20 | 20 | −11.0 |
| 2.5 | 50 | −21.0 | 10 | 50 | −7.5 |  |  |  |
| 2.5 | 65 | −45.0 | 10 | 60 | −22.5 |  |  |  |

Percent by weight.
Freezing point depression test: ASTM D1177. The literature values are included for comparison.
Handbook of Chemistry and Physics, 49th Edition (1968-1969).

TABLE 2

FOURTH ORDER POLYNOMIAL FIT TO FREEZING POINT DEPRESSION DATA $TF = A + B \cdot W + C \cdot W^2 + D \cdot W^3 + E \cdot W^4$ where TF = Freezing Point

| Constant A | Constant B | Constant C | Constant D | Constant E |
|---|---|---|---|---|
| Pure NaCl (TF = Freezing Pt. °K.; W = mole frac. NaCl In NaCl/H$_2$O) | | | | |
| 273.13983536 | −186.83545691 | −93.44743194 | −7390.3124586 | 3890.7099081 |
| Pure Glycerol (TF = Freezing Pt. °K.; W = mole frac. Glycerol In Gly/H$_2$O) | | | | |
| 273.16233351 | −103.64623515 | −303.3812321 | 37.63655643 | 2425.83014506 |
| 2.5% (wt) NaCl In NaCl/Gly/H$_2$O (TF = Freezing Pt. °F.; W = Wt. % Glycerol) | | | | |
| 29.45273525 | −0.43459361 | 0.01262182 | −0.00087012 | 0.0000078 |
| 10% (wt) NaCl In NaCl/Gly/H$_2$O (TF = Freezing Pt. °F.; W = Wt. % Glycerol) | | | | |
| 20.12773435 | −0.07787479 | −0.05694670 | 0.00110755 | −0.0000074 |
| 20% (wt) NaCl In NaCl/Gly/H$_2$O (TF = Freezing Pt. °F.; W = Wt. % Glycerol) | | | | |
| 0.15454183 | −0.80862948 | 0.00 | 0.00 | 0.00 |

Note:
CRC Handbook of Chemistry and Physics used for the pure NaCl and pure Glycerol freezing point depression data.

TABLE 3

Gas Hydrate Inhibition
Hydrate Formation Temperature Using Various Inhibitors

| Gas Composition (mole %) | | | | | | |
|---|---|---|---|---|---|---|
| Methane | 87.29 | Ethane | 7.55 | Propane | 3.09 | |
| i-Butane | 0.49 | n-Butane | 0.79 | Nitrogen | 0.40 | |
| n-Pentane | 0.39 | | | | | |

| Description | Temperature, °F., At Pressure = | | |
|---|---|---|---|
|  | 1000 Psia | 3000 Psia | 4500 Psia |
| Inhibitor - Free | 65.08 | 74.16 | 79.65 |
| 2.5% NaCl | 63.29 | 72.29 | 77.63 |
| 10% NaCl | 57.10 | 65.53 | 71.02 |
| 20% NaCl | 45.19 | 52.64 | 58.13 |
| 10% Glycerol | 62.19 | 71.19 | 76.53 |
| 35% Glycerol | 49.99 | 58.00 | 63.35 |
| 60% Glycerol | 26.47 | 32.52 | 37.72 |
| 2.5% NaCl + 10% Glycerol | 60.66 | 69.52 | 75.01 |
| 2.5% NaCl + 35% Glycerol | 46.22 | 53.95 | 59.30 |
| 2.5% NaCl + 60% Glycerol | 18.70 | 24.04 | 29.25 |
| 10% NaCl + 10% Glycerol | 53.43 | 61.58 | 67.07 |

TABLE 3-continued

Gas Hydrate Inhibition
Hydrate Formation Temperature Using Various Inhibitors

| Gas Composition (mole %) | | | | | | |
|---|---|---|---|---|---|---|
| Methane | 87.29 | Ethane | 7.55 | Propane | 3.09 |
| i-Butane | 0.49 | n-Butane | 0.79 | Nitrogen | 0.40 |
| n-Pentane | 0.39 | | | | | |

| Description | Temperature, °F., At Pressure = | | |
|---|---|---|---|
|  | 1000 Psia | 3000 Psia | 4500 Psia |
| 10% NaCl + 35% Glycerol | 33.03 | 39.64 | 44.84 |
| 10% NaCl + 60% Glycerol | 13.47 | 18.39 | 23.59 |
| 20% NaCl + 10% Glycerol | 38.26 | 45.29 | 50.64 |
| 20% NaCl + 35% Glycerol | 25.08 | 30.98 | 36.33 |
| 20% NaCl + 60% Glycerol | 12.03 | 16.81 | 22.16 |

TABLE 4

Gas Hydrate Inhibition
Synergy Effect on Mixing Inhibitors

Inhibitors Used
(A) 2.5% (wt) NaCl + 10% (wt) Glycerol
(B) 2.5% (wt) NaCl + 35% (wt) Glycerol
(C) 2.5% (wt) NaCl + 60% (wt) Glycerol

| Pressure Psia | Description | Hydrate Temperature Depression Due to Inhibition[1] | | |
|---|---|---|---|---|
| | | Inhibitor A | Inhibitor B | Inhibitor C |
| 1000 | Sum[2] | 4.68 | 16.88 | 40.40 |
| | Data | 4.42 | 18.86 | 46.38 |
| | Synergy[3] | −0.26 | 1.98 | 5.98 |
| 3000 | Sum | 4.84 | 18.03 | 43.51 |
| | Data | 4.64 | 20.21 | 50.12 |
| | Synergy | −0.20 | 2.18 | 6.61 |
| 4500 | Sum | 5.14 | 18.32 | 43.95 |
| | Data | 4.64 | 20.35 | 50.40 |
| | Synergy | −0.50 | 2.03 | 6.45 |

[1] $\Delta T_H$, °F. = $T_H$(no inhibition) − $T_H$(inhibition) where $T_H$ = Hydrate Formation Temperature, °F. $\Delta T_H$ = Hydrate Temperature Depression, °F.
[2] Sum = $\Delta T_H$(2.5% NaCl) = 1.74° F. at 1,000 Psia. Sum = $\Delta T_H$(2.5% NaCl) = 1.87° F. at 3,000 Psia. Sum = $\Delta T_H$(2.5% NaCl) = 2.02° F. at 4,500 Psia.
(See Table 3 for $T_H$ values)
[3] Synergy = Data − Sum

TABLE 5

Gas Hydrate Inhibition
Synergy Effect on Mixing Inhibitors

Inhibitors Used
(A) 10% (wt) NaCl + 10% (wt) Glycerol
(B) 10% (wt) NaCl + 35% (wt) Glycerol
(C) 10% (wt) NaCl + 60% (wt) Glycerol

| Pressure Psia | Description | Hydrate Temperature Depression Due to Inhibition[1] | | |
|---|---|---|---|---|
| | | Inhibitor A | Inhibitor B | Inhibitor C |
| 1000 | Sum[2] | 10.87 | 23.07 | 46.59 |
| | Data | 11.65 | 32.05 | 51.61 |
| | Synergy[3] | 0.78 | 8.98 | 5.02 |
| 3000 | Sum | 11.60 | 24.79 | 50.27 |
| | Data | 12.58 | 34.52 | 55.77 |
| | Synergy | 0.98 | 9.73 | 5.50 |
| 4500 | Sum | 11.75 | 24.93 | 50.56 |
| | Data | 12.58 | 34.81 | 56.06 |
| | Synergy | 0.83 | 9.88 | 5.50 |

[1] $\Delta T_H$, °F. = $T_H$(no inhibition) − $T_H$(inhibition) where $T_H$ = Hydrate Formation Temperature, °F. $\Delta T_H$ = Hydrate Temperature Depression, °F.
[2] Sum = $\Delta T_H$(10% NaCl) = 7.89° F. at 1,000 Psia. Sum = $\Delta T_H$(10% NaCl) = 8.63° F. at 3,000 Psia. Sum = $\Delta T_H$(10% NaCl) = 8.63° F. at 4,500 Psia.
(See Table 3 for $T_H$ values)
[3] Synergy = Data − Sum

TABLE 6

Gas Hydrate Inhibition
Synergy Effect on Mixing Inhibitors

Inhibitors Used
(A) 20% (wt) NaCl + 10% (wt) Glycerol
(B) 20% (wt) NaCl + 35% (wt) Glycerol
(C) 20% (wt) NaCl + 60% (wt) Glycerol

| Pressure Psia | Description | Hydrate Temperature Depression Due to Inhibition[1] | | |
|---|---|---|---|---|
| | | Inhibitor A | Inhibitor B | Inhibitor C |
| 1000 | Sum[2] | 22.78 | 34.98 | 58.50 |
| | Data | 26.82 | 40.00 | 53.05 |
| | Synergy[3] | 4.04 | 5.02 | −5.45 |
| 3000 | Sum | 24.49 | 37.68 | 63.16 |
| | Data | 28.87 | 43.18 | 57.35 |
| | Synergy | 4.38 | 5.50 | −5.81 |
| 4500 | Sum | 24.64 | 37.82 | 63.45 |
| | Data | 29.01 | 43.32 | 57.49 |
| | Synergy | 4.37 | 5.50 | −5.96 |

[1] $\Delta T_H$, °F. = $T_H$(no inhibition) − $T_H$(inhibition) where $T_H$ = Hydrate Formation Temperature, °F. $\Delta T_H$ = Hydrate Temperature Depression, °F.
[2] Sum = $\Delta T_H$(20% NaCl) = 19.89° F. at 1,000 Psia. Sum = $\Delta T_H$(20% NaCl) = 21.52° F. at 3,000 Psia. Sum = $\Delta T_H$(20% NaCl) = 21.52° F. at 4,500 Psia.
(See Table 3 for $T_H$ values)
[3] Synergy = Data − Sum

TABLE 7

| | Pill Formulation | | | | | | | | |
|---|---|---|---|---|---|---|---|---|---|
| | 1 | 2 | 3 | 4 | 5 | 6 | 7 | 8 | 9 |
| Water (ml) | 84 | 105 | 125 | 146 | 166 | 186 | 206 | 226 | 245 |
| *XC Polymer (gm) | 0.48 | 0.60 | 0.72 | 0.83 | 0.95 | 1.06 | 1.18 | 1.29 | 1.40 |
| NaCl (gm) | 21 | 26 | 31 | 36 | 41 | 46 | 51 | 56 | 61 |
| Glycerol (gm) | 253 | 222 | 192 | 162 | 132 | 102 | 73 | 43 | 14 |
| Density (ppg) | 10 | 10 | 9.9 | 9.8 | 9.8 | 9.70 | 9.60 | 9.50 | 9.40 |
| Barite (gm) | 232 | 237 | 241 | 246 | 251 | 255 | 260 | 264 | 269 |
| Density (ppg) | 14 | 14 | 14 | 144 | 14 | 14 | 14 | 14 | 13.80 |
| Rheologies 75° F. | | | | | | | | | |
| 600 RPM | THTM | 292 | 165 | 142 | 122 | 102 | 91 | 88 | 85 |
| 200 RPM | 225 | 176 | 132 | 85 | 72 | 67 | 63 | 61 | 56 |
| 200 RPM | 162 | 132 | 81 | 64 | 58 | 52 | 51 | 50 | 48 |
| 100 RPM | 100 | 80 | 55 | 42 | 40 | 37 | 37 | 37 | 35 |
| 6 RPM | 35 | 15 | 21 | 11 | 12 | 12 | 13 | 15 | 14 |
| 3 RPM | 21 | 12 | 12 | 9 | 9 | 10 | 11 | 13 | 12 |
| 10-Second Gel (lb/100 ft[2]) | 16 | 14 | 12 | 10 | 11 | 11 | 11 | 12 | 11 |
| 10-Minute Gel (lb/100 ft[2]) | 21 | 48 | 25 | 13 | 12 | 13 | 15 | 16 | 15 |
| Apparent Viscosity (cps) | — | 146 | 83 | 71 | 61 | 51 | 46 | 44 | 43 |
| Plastic Viscosity (cps) | — | 116 | 33 | 57 | 50 | 35 | 28 | 27 | 29 |
| Yield Point (lb/100 ft[2]) | — | 60 | 99 | 28 | 22 | 32 | 35 | 34 | 27 |
| Rheologies 44° F. | | | | | | | | | |
| 600 RPM | THTM | 488 | THTM | 252 | 184 | 145 | 129 | 115 | 109 |
| 200 RPM | 348 | 272 | 195 | 145 | 111 | 92 | 84 | 77 | 73 |
| 200 RPM | 246 | 192 | 143 | 107 | 83 | 71 | 66 | 61 | 58 |
| 100 RPM | 140 | 110 | 85 | 65 | 53 | 48 | 46 | 44 | 41 |
| 6 RPM | 18 | 16 | 16 | 15 | 14 | 15 | 15 | 17 | 15 |
| 3 RPM | 12 | 12 | 12 | 11 | 11 | 12 | 13 | 14 | 13 |
| 10-Second Gel (lb/100 ft[2]) | 14 | 14 | 12 | 12 | 12 | 13 | 13 | 14 | 13 |
| 10-Minute Gel (lb/100 ft[2]) | 70 | 42 | 24 | 15 | 14 | 16 | 16 | 17 | 16 |

TABLE 7-continued

| | Pill Formulation | | | | | | | | |
|---|---|---|---|---|---|---|---|---|---|
| | 1 | 2 | 3 | 4 | 5 | 6 | 7 | 8 | 9 |
| Apparent Viscosity (cps) | — | 244 | — | 126 | 92 | 73 | 65 | 58 | 55 |
| Plastic Viscosity (cps) | — | 216 | — | 107 | 73 | 53 | 45 | 38 | 36 |
| Yield Point (lb/100 ft$^2$) | — | 56 | — | 38 | 38 | 39 | 39 | 39 | 37 |
| Rheologies 4° F. | * | * | * | * | * | * | | | |
| 600 RPM | THTM | THTM | THTM | THTM | 348 | 323 | 243 | 195 | 172 |
| 200 RPM | THTM | THTM | 406 | 330 | 200 | 183 | 146 | 121 | 165 |
| 200 RPM | THTM | 414 | 364 | 234 | 144 | 136 | 110 | 93 | 81 |
| 100 RPM | 382 | 276 | 204 | 134 | 86 | 84 | 71 | 62 | 55 |
| 6 RPM | 38 | 30 | 28 | 2 | 20 | 20 | 20 | 20 | 18 |
| 3 RPM | 24 | 22 | 20 | 16 | 14 | 16 | 16 | 17 | 14 |
| 10-Second Gel (lb/100 ft$^2$) | 24 | 22 | 20 | 18 | 16 | 15 | 16 | 16 | 15 |
| 10-Minute Gel (lb/100 ft$^2$) | 54 | 30 | 24 | 22 | 20 | 19 | 19 | 19 | 17 |
| Apparent Viscosity (cps) | — | — | — | — | 174 | 162 | 122 | 98 | 86 |
| Plastic Viscosity (cps) | — | — | — | — | 148 | 140 | 97 | 74 | 7 |
| Yield Point (lb/100 ft$^2$) | — | — | — | — | 52 | 43 | 49 | 47 | 158 |

THTM = too high to measure.
Rheology was determined using a FANN 35-A with a standard spring or a spring twice the standard strength. This is indicated by an asterisk (*).
*XC Polymer is a water-soluble polymer including polysaccharides, as sold under the trade name "Kelzan XC" by Kelco Corp.

TABLE 8

| | Pill Contamination | | | | | | | |
|---|---|---|---|---|---|---|---|---|
| | Percent Pill Added to Mud (by volume) | | | | | Percent Glycerol | | |
| | 0 | 10 | 20 | 30 | 40 | 10 | 23 | 46 |
| Rheologies (75° F.) | | | | | | | | |
| 600 RPM | 140.0 | 142.0 | 137.0 | 129.0 | 125.0 | 135.0 | 130.0 | 128.0 |
| 300 RPM | 95.0 | 95.0 | 97.0 | 86.0 | 84.0 | 89.0 | 83.0 | 78.0 |
| Plastic Viscosity (cps) | 45.0 | 47.0 | 40.0 | 43.0 | 43.0 | 43.0 | 36.0 | 28.0 |
| Yield Point (lb/100 ft$^2$) | 50.0 | 48.0 | 57.0 | 43.0 | 43.0 | 43.0 | 36.0 | 28.0 |
| 10-Second Gel (lb/100 ft$^2$) | 10.0 | 9.0 | 8.0 | 9.0 | 8.0 | 7.0 | 5.0 | 3.0 |
| 10-Minute Gel | 17.0 | 16.0 | 14.0 | 12.0 | 11.0 | 12.0 | 8.0 | 4.0 |
| API Fluid Loss (ml) | 11.6 | 11.0 | 10.0 | 9.4 | 9.6 | 9.2 | 7.8 | 6.0 |
| Cake Thickness (32nd inch) | 3.0 | 2.0 | 2.0 | 2.0 | 2.0 | 2.0 | 2.0 | 2.0 |
| HTHP$^1$ (200° F.) | 45.0 | 32.4 | 31.6 | 39.6 | 31.0 | | | |
| Cake Thickness (32 in) | 8.0 | 6.0 | 5.0 | 7.0 | 5.0 | | | |

Pill was formulated to 12.6 ppg with 0.83 lb/bbl of XC in the 20 percent NaCl. Glycerol made up the remainder of the fluid phase (54 percent by weight). Mud was a 17 percent NaCl polymer system (Mississippi Canyon).
$^1$HPHT = high pressure high temperature. HPHT fluid loss test is described in Standard Procedures of Field Testing Drilling Fluid (RP 13B).
Test for fluid loss using the API fluid loss test described in Standard Procedures of Field Testing Drilling Fluid (RP 13b). Plastic viscosity, yield point, and gel strengths were determined with a Fann 35A following the procedures outlined in API RP 13b.

TABLE 9

| | Pill Formulated with Field Mud | | | | |
|---|---|---|---|---|---|
| | Percent Glycerol | | | | |
| | 0 | 10 | 20 | 30 | 40 |
| Rheologies (75° F.) | | | | | |
| 600 RPM | 140 | 140 | 139 | 138 | 134 |
| 300 RPM | 95 | 96 | 94 | 93 | 91.2 |
| Plastic Viscosity (cps) | 45 | 44 | 45 | 45 | 42.8 |
| Yield Point (lb/100 Ft2) | 50 | 52 | 49 | 48 | 48.4 |
| 10 Second Gel (lb/100 Ft$^2$) | 10 | 11 | 12 | 9 | 8 |
| 10 Minute Gel (lb/100 Ft$^2$) | 17 | 18 | 17 | 15 | 13 |
| API Fluid Loss (ml) | 11.6 | 11 | 10 | 9.5 | 8.1 |
| Cake Thickness (32nd in) | 3 | 3 | 3 | 2 | 2 |
| HTHP (200° F.) | 45 | 44 | 41.3 | 36.4 | 31.5 |
| Cake Thickness (32nd in) | 8 | 7 | 6 | 6 | 6 |

This field mud had a weight of 12.6 ppg.
By volume the mud was diluted with glycerol and weighted with barite.
Field mud was a 17 percent NaCl polymer system (Mississippi Canyon).
$^1$HPHT = High Pressure High Temperature. HPHT fluid loss test is described in Standard Procedures of Field Testing Drilling Fluid (RP 13B).
$^3$Test for fluid loss using the API fluid loss test described in Standard Procedures of Field Testing Drilling Fluid (RP 13B).
- Plastic Viscosity, yield point and gel strengths were determined with a Fann 35A following procedures outlined in API RP 13B.

TABLE 10

| | Pill Formulated with PECP | | |
|---|---|---|---|
| | 1 | 2 | 3 |
| Water (ml) | 186.00 | 131.00 | 111.00 |
| *XC Polymer (gm) | 0.75 | 0.50 | 0.30 |
| NaCl (gm) | 46.00 | 35.00 | 28.00 |
| PECP | 102.00 | 184.00 | 223.00 |
| Barite | 255.00 | 247.00 | 236.00 |
| Rheology 75° F. | | | |
| 300 RPM | 135. | 182. | 256. |
| 200 RPM | 101. | 135. | 183. |
| 100 RPM | 62. | 82. | 122. |
| 6 RPM | 25. | 15. | 42. |
| 3 RPM | 22. | 11. | 27. |
| 10-Second Gel | 18. | 11. | 18. |
| 10-Minute Gel | 25. | 23. | 26. |
| Apparent Viscosity (cps) | 127.50 | 149. | |
| Plastic Viscosity (cps) | 120. | 116. | |
| Yield Point (lb/100 ft$^2$) | 15. | 66. | |
| Rheology 44° F. | | | |
| 600 RPM | 415. | 477. | THTM |
| 300 RPM | 226. | 266. | THTM |
| 200 RPM | 165. | 185. | 352. |
| 100 RPM | 92. | 102. | 266. |
| 6 RPM | 27. | 15. | 22. |
| 3 RPM | 23. | 11. | 18. |
| 10-Second Gel | 19. | 11. | 17. |
| 10-Minute Gel | 27. | 23. | 38. |
| Apparent Viscosity (cps) | 207.50 | 238.50 | |
| Plastic Viscosity (cps) | 189.00 | 211.00 | |

TABLE 10-continued

| Pill Formulated with PECP | | | |
|---|---|---|---|
| | 1 | 2 | 3 |
| Yield Point (lb/100 ft²) | 37.00 | 55.00 | |
| Rheology 4° F. | | | |
| 600 RPM | 595. | THTM | THTM |
| 300 RPM | 326. | 565. | THTM |
| 200 RPM | 232. | 429. | THTM |
| 100 RPM | 131. | 256. | 392. |
| 6 RPM | 28. | 29. | 42. |
| 3 RPM | 25. | 24. | 26. |
| 10-Second Gel | 26. | 18. | 29. |
| 10-Minute Gel | 30. | 33. | 42. |
| Apparent Viscosity (cps) | 297.5 | | |
| Plastic Viscosity (cps) | 269. | | |
| Yield Point (lb/100 ft²) | 57. | | |

Plastic viscosity, yield point, and gel strengths were determined with a Fann 35A following procedures outlined in API RP 13B.

TABLE 11

| Pill Contamination With PECP | | | |
|---|---|---|---|
| | Percent Pill Added to Mud (by Volume) | | |
| | 0 | 10 | 20 |
| Rheologies (74° F.) | | | |
| 600 RPM | 140.00 | 148.00 | 155.00 |
| 300 RPM | 95.00 | 97.00 | 101.00 |
| Plastic Viscosity (cps) | 45.00 | 51.00 | 54.00 |
| Yield Point (lb/100 ft²) | 50.00 | 46.00 | 47.00 |
| 10-Second Gels | 10.00 | 9.00 | 11.00 |
| 10-Minute Gels | 17.00 | 18.00 | 17.00 |
| API Fluid Loss (ml) | 11.60 | 5.50 | 4.10 |
| Cake Thickness (1/32 inch) | 3.00 | 2.00 | 2.00 |
| HTHP 200° F. | 45.00 | 25.00 | 16.50 |
| Cake Thickness (1/32 inch) | 8.00 | 4.00 | 3.00 |

Pill was formulated to 12.6 ppg with 0.5 lb/bbl XC in 20% NaCl.
PECP made up the remainder of the fluid phase (54.1 percent by weight).
Mud was a 17% NaCl polymer system (Mississippi Canyon).
1 HPHT = High Pressure High Temperature. HPHT fluid loss is described in Standard Procedures of Field Testing Drilling Fluid (RP 13B).
Test for fluid loss using the API fluid loss test described in Standard Procedures of Field Testing Drill Fluid (RP 13B).
Plastic Viscosity, yield point and gel strengths were determined with a Fann 35A following procedures outlined in API RP 13B.

Results in Table 12 suggest that POLS or PECP could be used to prevent formation of gas hydrates. The freezing point depression data clearly suggest that this is a viable alternate to glycerol.

FIG. 1 discloses a drill ship (1) located over a wellhead and blowout preventor (2). The wellhead area requires hydrate inhibition protection during a gas kick, which kick enters wellbore (3). In the event that the rig (1) is moved, for example due to a storm, or in the event circulation is stopped, a drilling mud having the hydrate inhibitor of the present invention is injected into the wellhead area 2 to provide the protection desired.

The foregoing description of the invention is merely intended to be explanatory thereof, and various changes in the details of the described method and apparatus may be made within the scope of the appended claims without departing from the spirit of the invention.

TABLE 12

| | | | | Freezing Point Depression Data | | | | | |
|---|---|---|---|---|---|---|---|---|---|
| Alcohol | | | | Experimental Data | | | Curve Fit Data | | |
| Solution % | PECP % | Glycerol % | POLS % | PECP °F. | Glycerol °F. | POLS °F. | PECP °F. | Glycerol °F. | POLS °F. |
| 0 | 0 | 0 | 0 | 32 | 32 | 32 | 30.9 | 32.8 | 33.0 |
| 10 | 6.3 | 10 | 8.8 | 30 | 27.5 | 29.35 | 29.4 | 27.9 | 29.2 |
| 15 | 9.45 | 15 | 13.2 | 29 | 24.5 | 27.5 | 27.4 | 24.8 | 26.6 |
| 20 | 12.6 | 20 | 17.6 | 27.5 | 23 | 26 | 24.6 | 21.3 | 23.5 |
| 30 | 18.9 | 30 | 26.4 | 26 | 14 | 21.9 | 16.3 | 12.9 | 16.1 |
| 40 | 25.2 | 40 | 35.2 | 20 | 5 | 14.9 | 4.7 | 2.8 | 7.0 |
| 50 | 31.5 | 50 | 44 | 14 | −13.5 | −6.5 | −10.4 | −9.0 | −4.0 |
| 60 | 37.8 | 60 | 52.8 | 8.5 | −26 | — | −28.8 | −22.5 | −16.8 |
| 65 | 40.95 | 65 | 57.2 | 5.5 | −25.5 | −9.5 | −39.3 | −29.9 | −23.8 |
| 80 | 50.4 | 80 | 70.4 | −12.5 | — | — | — | — | — |

Freezing point depression was done by ASTM D-1177 method.
Fresh water was the base medium.
Equations:
Freezing point, (°F.) = 30.902 + 0.022099 * percent PECP − 0.01695 * percent PECP 2.
Freezing point, (°F.) = 32.761 − 0.4014 * percent glycerol − 0.008666 * percent glycerol 2.
Freezing point, (°F.) = 32.991 − 0.2936 * percent POLS − 0.008935 * percent POLS 2.

What is claimed is:

1. A process for inhibiting gas hydrate formation in the production fluid of a well, connected facilities and pipelines of the well comprising injecting into the well inhibitor comprising a carrier and a polycyclicpolyetherpolyol.

2. The method of claim 1 wherein the polycyclicpolyetherpolyol which is characterized by binodal molecular weight distribution, $M_w$ in excess of 50,000, said $M_w$ being determined in a three-column gel permeation chromatography, and being 0.5 to 10% w epoxy structures.

3. The method of claim 1 wherein the polycyclicpolyetherpolyol is further characterized by molecular structures which are no more than 20% free of associated cyclic formations.

4. A process for shutting-in a well having a fluid therein which is susceptible to the formation of gas hydrates, comprising:
preparing a gas hydrate inhibitor by admixing an alcohol with a carrier, said carrier and said alcohol and the quantities thereof being selected to be compatible with the well and effective to prevent the formation of gas hydrates in said well fluid;
selecting an appropriate location, depending upon the type of well being shut-in, and injecting the gas hydrate inhibitor into said well at said location; and shutting-in the well.

5. The process of claim 4 wherein the hydrate inhibitor includes an inorganic salt.

6. The process of claim 4 wherein the hydrate inhibitor includes from 5% by weight to 25% by weight salt and wherein the alcohol is from 10% by weight to 40% by weight glycerol.

7. The process of claim 4 wherein the well is an offshore tension leg platform and the hydrate inhibitor injection location is selected from a connected facilities/pipeline or tubing above or below the mud line.

8. The process of claim 4 wherein the shut-in is for emergency purposes, the well is to be temporarily abandoned by a drill-ship, and the hydrate inhibitor is in the form of a pill comprising drilling fluid carrier admixed with said alcohol, said pill being injected into a blowout preventor associated with the well.

9. The process of claim 4 wherein the well is a producing well which is to be temporarily shut-in, the hydrate inhibitor being injected into the well tubing and mixing with produced water.

10. The process of claim 4 wherein the carrier is selected from the group consisting of polymer-based drilling fluids and bentonite-based drilling fluids.

11. The process of claim 4 wherein the alcohol is selected from the group consisting of (1) an acyclic polyol having 3 to 80 carbon atoms and 2 to 60 hydroxyl groups, (2) a monocyclicpolyol having 5 to 30 carbon atoms and 2 to 10 hydroxyl groups, and (3) a cyclicetherpolyol having 6 to 1800 carbon atoms, 2 to 450 hydroxyl groups, and 2 to 600 ether linkages.

* * * * *